US012568484B2

(12) United States Patent
Zewail et al.

(10) Patent No.: US 12,568,484 B2
(45) Date of Patent: Mar. 3, 2026

(54) APPARATUS FOR WIRELESS COMMUNICATIONS, AND A METHOD THEREOF

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Mostafa Khoshnevisan, San Diego, CA (US); Xiaoxia Zhang, San Diego, CA (US)

( * ) Notice: Subject to any disclaimer, the term of this patent is extended or adjusted under 35 U.S.C. 154(b) by 321 days.

(21) Appl. No.: 18/340,749

(22) Filed: Jun. 23, 2023

(65) Prior Publication Data

US 2024/0430883 A1      Dec. 26, 2024

(51) Int. Cl.
*H04W 72/1263*      (2023.01)
*H04L 5/14*      (2006.01)

(52) U.S. Cl.
CPC .......... *H04W 72/1263* (2013.01); *H04L 5/14* (2013.01)

(58) Field of Classification Search
CPC ............................. H04W 72/1263; H04L 5/14
See application file for complete search history.

(56) References Cited

U.S. PATENT DOCUMENTS

2019/0068237 A1      2/2019   Stirling-Gallacher et al.
2019/0215828 A1      7/2019   Kim et al.
2019/0363843 A1 *   11/2019   Gordaychik .......... H04L 1/1835
2022/0132534 A1 *    4/2022   Jang ....................... H04L 5/0051
2022/0225360 A1 *    7/2022   Yi ...................... H04W 72/1268
2022/0248338 A1      8/2022   Liu et al.
2022/0330309 A1     10/2022   Abotabl et al.
2023/0188301 A1 *    6/2023   Ma ............................ H04L 1/16
2023/0217478 A1 *    7/2023   Oh ......................... H04L 1/0003
                                                                    370/329
2024/0224271 A1 *    7/2024   Xiong ............... H04W 56/0015
2024/0372661 A1 *   11/2024   Park ...................... H04L 5/0044
2024/0406710 A1 *   12/2024   Lim ........................ H04L 5/0051
2024/0422775 A1 *   12/2024   Jang ......................... H04L 1/08
2025/0008512 A1 *    1/2025   Jang ....................... H04L 5/0051

FOREIGN PATENT DOCUMENTS

WO      WO-2022241654 A1     11/2022

* cited by examiner

*Primary Examiner* — Brian D Nguyen

(57)                      ABSTRACT

Methods, systems, and devices for wireless communications are described. Techniques described herein provide for independent scheduling by a first transmission and reception point (TRP) and a second TRP for a user equipment (UE) operable in a multiple TRP (mTRP) mode. A semi-static time division duplexing (TDD) pattern may indicate a set of downlink symbols, a set of uplink symbols and a set of flexible symbols. A portion of the flexible symbols may be dedicated for communications with the first TRP, and the second TRP may not use the portion of the flexible symbols dedicated for communications with the first TRP. The first UE may operate in the mTRP mode in the semi-static downlink symbols or uplink symbols and operate in a single TRP mode in the portion of the flexible symbols dedicated for communications with the first TRP.

30 Claims, 17 Drawing Sheets

610 — Control Signaling Indicating Semi-static TDD Pattern for First UE

Control Signaling Indicating mTRP mode

615

Control Signaling Indicating TDD Pattern for First UE

620

Scheduling Information

625

Scheduling Information

630

635 — Message(s)

Message(s)

640 — Control Signaling Indicating Semi-static TDD Pattern For Second UE

Message(s)

645

600

Receiver

1110

Communications Manager

1120

Transmitter

1115

1105

1100

1325

1330

1335

1340

1320

1300

130

105

115

Network
Entity

Transceiver

1410

Antenna

1415

Communications
Manager

1420

Memory

Code

1430

1425

1440

Processor

1435

1405

1400

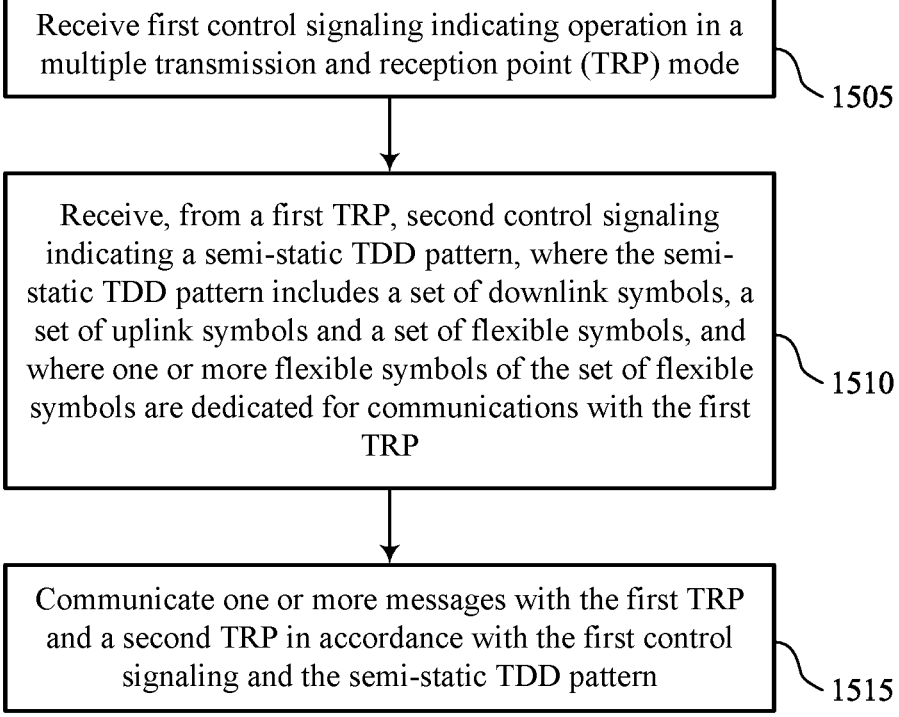

Receive first control signaling indicating operation in a multiple transmission and reception point (TRP) mode

1505

Receive, from a first TRP, second control signaling indicating a semi-static TDD pattern, where the semi-static TDD pattern includes a set of downlink symbols, a set of uplink symbols and a set of flexible symbols, and where one or more flexible symbols of the set of flexible symbols are dedicated for communications with the first TRP

1510

Communicate one or more messages with the first TRP and a second TRP in accordance with the first control signaling and the semi-static TDD pattern

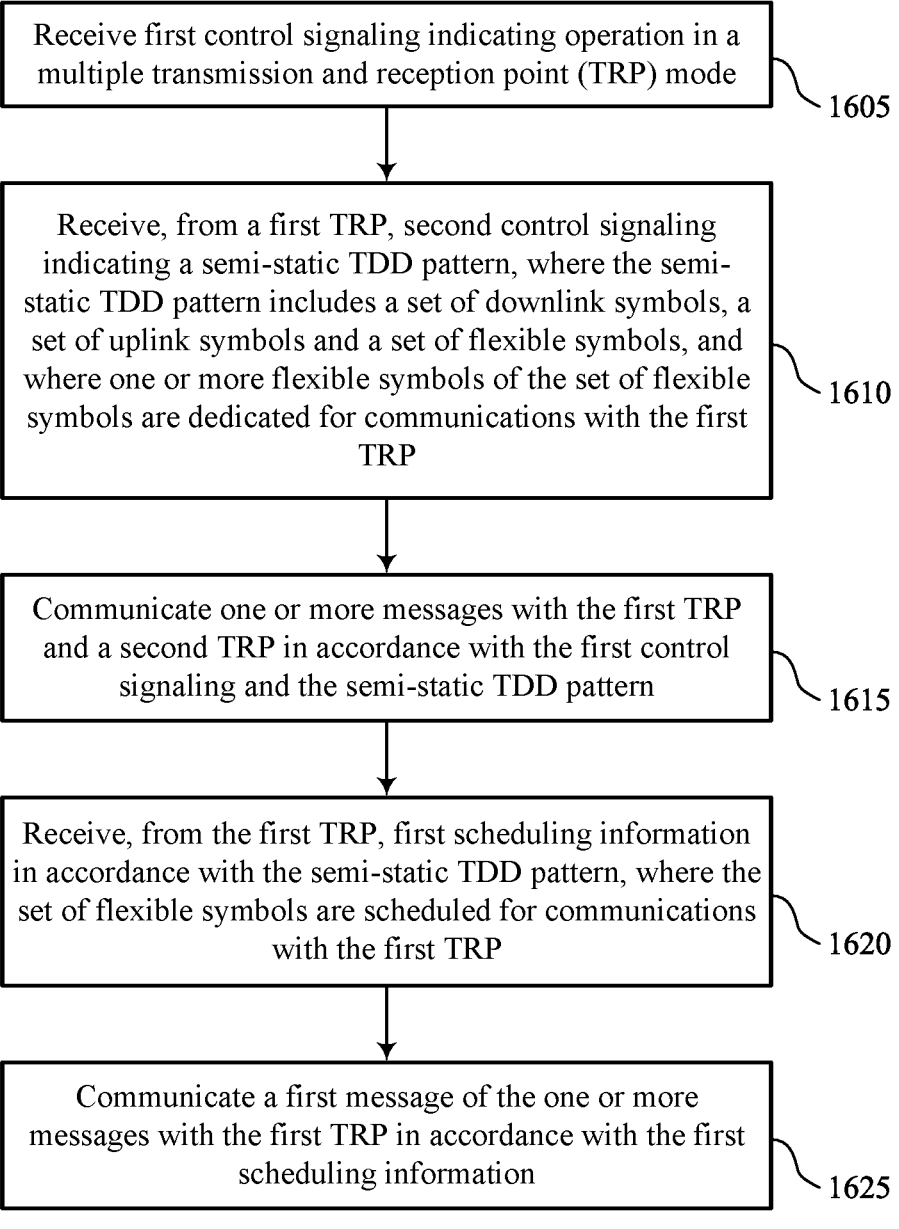

Receive first control signaling indicating operation in a multiple transmission and reception point (TRP) mode

1605

Receive, from a first TRP, second control signaling indicating a semi-static TDD pattern, where the semi-static TDD pattern includes a set of downlink symbols, a set of uplink symbols and a set of flexible symbols, and where one or more flexible symbols of the set of flexible symbols are dedicated for communications with the first TRP

1610

Communicate one or more messages with the first TRP and a second TRP in accordance with the first control signaling and the semi-static TDD pattern

1615

Receive, from the first TRP, first scheduling information in accordance with the semi-static TDD pattern, where the set of flexible symbols are scheduled for communications with the first TRP

1620

Communicate a first message of the one or more messages with the first TRP in accordance with the first scheduling information

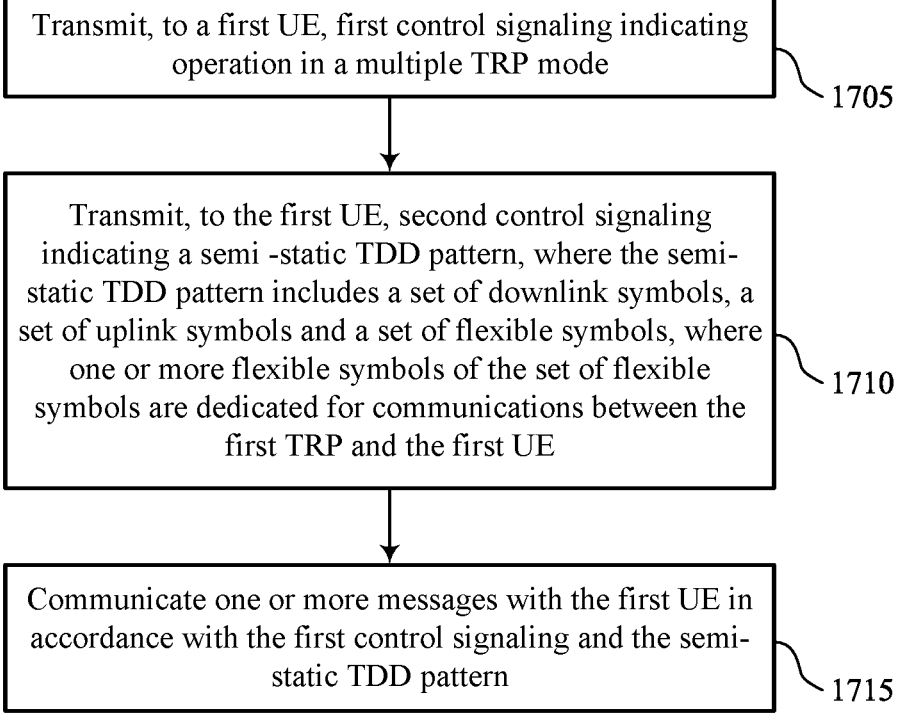

Transmit, to a first UE, first control signaling indicating operation in a multiple TRP mode

1705

Transmit, to the first UE, second control signaling indicating a semi -static TDD pattern, where the semi-static TDD pattern includes a set of downlink symbols, a set of uplink symbols and a set of flexible symbols, where one or more flexible symbols of the set of flexible symbols are dedicated for communications between the first TRP and the first UE

1710

Communicate one or more messages with the first UE in accordance with the first control signaling and the semi-static TDD pattern

APPARATUS FOR WIRELESS COMMUNICATIONS, AND A METHOD THEREOF

FIELD OF TECHNOLOGY

The following relates to wireless communications, including techniques for dynamic time division duplexing with independent transmission and reception points.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for dynamic time division duplexing (TDD) with independent transmission and reception points (TRPs). For example, the described techniques provide for independent scheduling by a first TRP and a second TRP for a user equipment (UE) operable in a multiple TRP (mTRP) mode. A semi-static TDD pattern may indicate a set of downlink symbols, a set of uplink symbols and a set of flexible symbols. A portion of the flexible symbols may be dedicated for communications with the first TRP, and the second TRP may not use the portion of the flexible symbols dedicated for communications with the first TRP. The first UE may operate in the mTRP mode in the semi-static downlink symbols or uplink symbols and operate in a single TRP mode in the portion of the flexible symbols dedicated for communications with the first TRP.

A method for wireless communications at a UE is described. The method may include receiving, from a first TRP, first control signaling indicating operation in a multiple TRP mode, receiving, from the first TRP, second control signaling indicating a semi-static time division duplexing (TDD) pattern, where the semi-static TDD pattern includes a set of downlink symbols, a set of uplink symbols and a set of flexible symbols, and where one or more flexible symbols of the set of flexible symbols are dedicated for communications with the first TRP, and communicating one or more messages with the first TRP and a second TRP in accordance with the first control signaling and the semi-static TDD pattern.

An apparatus for wireless communications at a UE is described. The apparatus may include at least one processor, at least one memory coupled with the at least one processor, and instructions stored in the at least one memory. The instructions may be executable by the at least one processor to cause the apparatus to receive, from a first TRP, first control signaling indicating operation in a multiple TRP mode, receive, from the first TRP, second control signaling indicating a semi-static TDD pattern, where the semi-static TDD pattern includes a set of downlink symbols, a set of uplink symbols and a set of flexible symbols, and where one or more flexible symbols of the set of flexible symbols are dedicated for communications with the first TRP, and communicate one or more messages with the first TRP and a second TRP in accordance with the first control signaling and the semi-static TDD pattern.

Another apparatus for wireless communications at a UE is described. The apparatus may include means for receiving, from a first TRP, first control signaling indicating operation in a multiple TRP mode, means for receiving, from the first TRP, second control signaling indicating a semi-static TDD pattern, where the semi-static TDD pattern includes a set of downlink symbols, a set of uplink symbols and a set of flexible symbols, and where one or more flexible symbols of the set of flexible symbols are dedicated for communications with the first TRP, and means for communicating one or more messages with the first TRP and a second TRP in accordance with the first control signaling and the semi-static TDD pattern.

A non-transitory computer-readable medium storing code for wireless communications at a UE is described. The code may include instructions executable by a processor to receive, from a first TRP, first control signaling indicating operation in a multiple TRP mode, receive, from the first TRP, second control signaling indicating a semi-static TDD pattern, where the semi-static TDD pattern includes a set of downlink symbols, a set of uplink symbols and a set of flexible symbols, and where one or more flexible symbols of the set of flexible symbols are dedicated for communications with the first TRP, and communicate one or more messages with the first TRP and a second TRP in accordance with the first control signaling and the semi-static TDD pattern.

Some examples of the method, apparatuses, and non-transitory computer-readable medium described herein may further include operations, features, means, or instructions for receiving, from the first TRP, first scheduling information in accordance with the semi-static TDD pattern, where the set of flexible symbols may be scheduled for communications with the first TRP and communicating a first message of the one or more messages with the first TRP in accordance with the first scheduling information.

Some examples of the method, apparatuses, and non-transitory computer-readable medium described herein may further include operations, features, means, or instructions for receiving, from the second TRP, second scheduling information in accordance with the semi-static TDD pattern, where one or more uplink symbols of the set of uplink symbols may be scheduled for communications with the second TRP, or one or more downlink symbols of the set of downlink symbols may be scheduled for communications with the second TRP, or a combination thereof and communicating a second message of the one or more messages with the second TRP in accordance with the second scheduling information and the semi-static TDD pattern.

In some examples of the method, apparatuses, and non-transitory computer-readable medium described herein, one or more second flexible symbols of the set of flexible symbols may be dedicated for communications with the second TRP.

Some examples of the method, apparatuses, and non-transitory computer-readable medium described herein may further include operations, features, means, or instructions for receiving, from the second TRP, second scheduling information in accordance with the semi-static TDD pattern, where one or more uplink symbols of the set of uplink symbols may be scheduled for communications with the second TRP, one or more downlink symbols of the set of downlink symbols may be scheduled for communications with the second TRP, one or more flexible symbols of the one or more second flexible symbols may be scheduled for communications with the second TRP, or a combination thereof and communicating a first message of the one or more messages with the second TRP in accordance with the second scheduling information and the semi-static TDD pattern.

In some examples of the method, apparatuses, and non-transitory computer-readable medium described herein, the semi-static TDD pattern includes a guard symbol between the one or more flexible symbols of the set of flexible symbols dedicated for communications with the first TRP and the one or more second flexible symbols of the set of flexible symbols dedicated for communications with the second TRP.

In some examples of the method, apparatuses, and non-transitory computer-readable medium described herein, one or more flexible symbols of the set of flexible symbols of the semi-static TDD pattern may be dedicated for uplink communications or one or more flexible symbols of the set of flexible symbols of the semi-static TDD pattern may be dedicated for downlink communications or a combination thereof.

A method for wireless communications at a first transmission and reception point (TRP) is described. The method may include transmitting, to a first UE, first control signaling indicating operation in a multiple TRP mode, transmitting, to the first UE, second control signaling indicating a semi-static TDD pattern, where the semi-static TDD pattern includes a set of downlink symbols, a set of uplink symbols and a set of flexible symbols, where one or more flexible symbols of the set of flexible symbols are dedicated for communications between the first TRP and the first UE, and communicating one or more messages with the first UE in accordance with the first control signaling and the semi-static TDD pattern.

An apparatus for wireless communications at a first transmission and reception point (TRP) is described. The apparatus may include at least one processor, at least one memory coupled with the at least one processor, and instructions stored in the at least one memory. The instructions may be executable by the at least one processor to cause the apparatus to transmit, to a first UE, first control signaling indicating operation in a multiple TRP mode, transmit, to the first UE, second control signaling indicating a semi-static TDD pattern, where the semi-static TDD pattern includes a set of downlink symbols, a set of uplink symbols and a set of flexible symbols, where one or more flexible symbols of the set of flexible symbols are dedicated for communications between the first TRP and the first UE, and communicate one or more messages with the first UE in accordance with the first control signaling and the semi-static TDD pattern.

Another apparatus for wireless communications at a first transmission and reception point (TRP) is described. The apparatus may include means for transmitting, to a first UE, first control signaling indicating operation in a multiple TRP mode, means for transmitting, to the first UE, second control signaling indicating a semi-static TDD pattern, where the semi-static TDD pattern includes a set of downlink symbols, a set of uplink symbols and a set of flexible symbols, where one or more flexible symbols of the set of flexible symbols are dedicated for communications between the first TRP and the first UE, and means for communicating one or more messages with the first UE in accordance with the first control signaling and the semi-static TDD pattern.

A non-transitory computer-readable medium storing code for wireless communications at a first transmission and reception point (TRP) is described. The code may include instructions executable by a processor to transmit, to a first UE, first control signaling indicating operation in a multiple TRP mode, transmit, to the first UE, second control signaling indicating a semi-static TDD pattern, where the semi-static TDD pattern includes a set of downlink symbols, a set of uplink symbols and a set of flexible symbols, where one or more flexible symbols of the set of flexible symbols are dedicated for communications between the first TRP and the first UE, and communicate one or more messages with the first UE in accordance with the first control signaling and the semi-static TDD pattern.

Some examples of the method, apparatuses, and non-transitory computer-readable medium described herein may further include operations, features, means, or instructions for transmitting, to the first UE, first scheduling information in accordance with the semi-static TDD pattern, where the set of flexible symbols may be scheduled for communications between the first TRP and the first UE and communicating a first message of the one or more messages with the first UE in accordance with the first scheduling information.

In some examples of the method, apparatuses, and non-transitory computer-readable medium described herein, one or more uplink symbols of the set of uplink symbols may be available for communications between the first UE and the second TRP, or one or more downlink symbols of the set of downlink symbols may be available for communications between the first UE and the second TRP, or a combination thereof.

In some examples of the method, apparatuses, and non-transitory computer-readable medium described herein, one or more second flexible symbols of the set of flexible symbols may be dedicated for communications between the first UE and the second TRP.

In some examples of the method, apparatuses, and non-transitory computer-readable medium described herein, one or more uplink symbols of the set of uplink symbols may be available for communications between the first UE and the second TRP, one or more downlink symbols of the set of downlink symbols may be available for communications between the first UE and the second TRP, one or more flexible symbols of the one or more second flexible symbols may be available for communications between the first UE and a second TRP, or a combination thereof.

In some examples of the method, apparatuses, and non-transitory computer-readable medium described herein, the semi-static TDD pattern includes a guard symbol between the one or more flexible symbols of the set of flexible symbols dedicated for communications between the first TRP and the first UE and the one or more second flexible symbols of the set of flexible symbols dedicated for communications between the second TRP and the first UE.

In some examples of the method, apparatuses, and non-transitory computer-readable medium described herein, one or more flexible symbols of the set of flexible symbols of the semi-static TDD pattern may be dedicated for uplink communications or one or more flexible symbols of the set of flexible symbols of the semi-static TDD pattern may be dedicated for downlink communications or a combination thereof.

In some examples of the method, apparatuses, and non-transitory computer-readable medium described herein, communicating, with the second TRP, third control signaling indicating the semi-static TDD pattern.

In some examples of the method, apparatuses, and non-transitory computer-readable medium described herein, communicating, with the second TRP, third control signaling indicating a second semi-static TDD pattern, the second semi-static TDD pattern includes a set of downlink symbols, a set of uplink symbols and a set of flexible symbols dedicated for communications between a second UE and the second TRP and communicating one or more messages with the second UE in accordance with the second semi-static TDD pattern.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIGS. 15 through 17 show flowcharts illustrating methods that support techniques for dynamic TDD with independent TRPs in accordance with one or more aspects of the present disclosure.

DETAILED DESCRIPTION

Some wireless communications systems may include multiple independent network entities, such as gNBs, that communicate with user equipments (UEs). A UE may operate in a single transmission and reception point (TRP) mode, such that the UE may communicate uplink or downlink signals with a single TRP via a single beam. Additionally, the UE may operate in a multiple TRP (mTRP) mode, such that the UE may simultaneously communicate uplink or downlink signals with two different TRPs via two different beams. The multiple independent network entities may perform as multiple independent TRPs. Scheduling communications with the UE may be independent between the independent TRPs, and the UE may have simultaneous transmission and simultaneous reception capability. If one independent TRP schedules the UE to transmit and another independent TRP schedules, at the same time, the UE to receive, there may be an uplink downlink collision, and the independent scheduling of the independent TRPs may fail.

To allow independent scheduling by a first TRP and a second TRP for a UE operable in the mTRP mode, a semi-static time division duplex (TDD) pattern may include a set of downlink symbols, a set of uplink symbols and a set of flexible symbols, and a portion of the flexible symbols may be dedicated for communications with the first TRP. Additionally, a portion of the set of flexible symbols may be dedicated for uplink communications or downlink communications or a combination thereof for communications with either the first TRP or the second TRP. In some cases, a portion of the set of flexible symbols may be dedicated for communications with the second TRP. In some examples, the semi-static TDD pattern may indicate a guard symbol separating one of the flexible symbols dedicated to the first TRP and one of the flexible symbols dedicated to the second TRP. The first TRP may transmit, to the UE, control signaling indicating the semi-static TDD pattern. The UE may communicate one or more messages with the first TRP and the second TRP in accordance with the semi-static TDD pattern. In some examples, the first TRP and the second TRP may consider load balancing with the flexible symbols of the first UE being dedicated for communications with the first TRP, and the flexible symbols of a second UE being dedicated for communications with the second TRP.

Aspects of the disclosure are initially described in the context of wireless communications systems. Additional aspects of the disclosure are described in the context of wireless communications system, examples of semi-static TDD patterns and an example process flow. Aspects of the disclosure are further illustrated by and described with reference to apparatus diagrams, system diagrams, and flowcharts that relate to techniques for dynamic TDD with independent TRPs.

Figure 1:
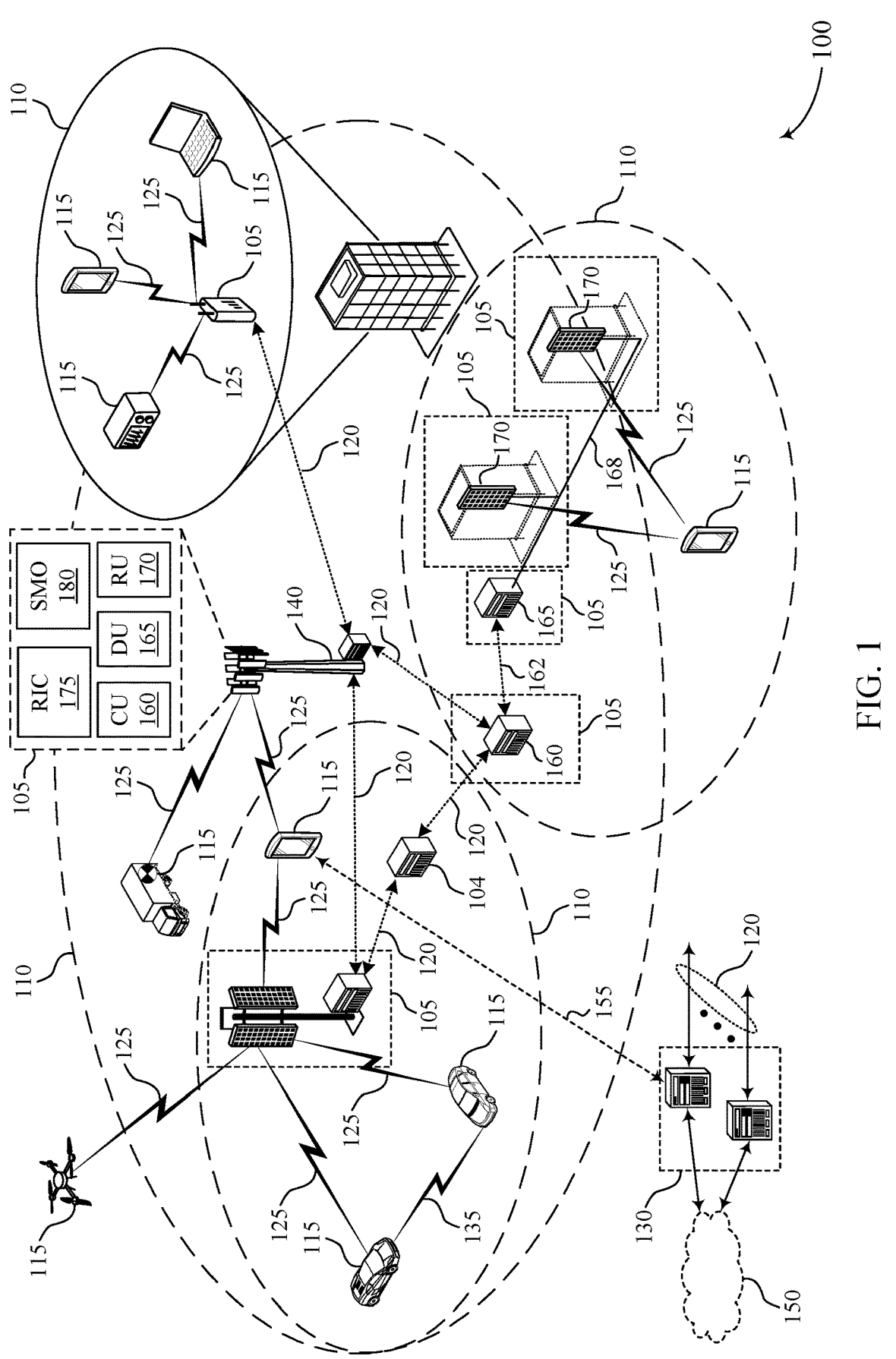
FIG. 1 shows an example of a wireless communications system that supports techniques for dynamic time division duplexing with independent transmission and reception points in accordance with one or more aspects of the present disclosure.

FIG. 1 shows an example of a wireless communications system 100 that supports techniques for dynamic TDD with independent TRPs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for dynamic TDD with independent TRPs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $TS=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-Device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some wireless communications systems 100 may include multiple independent network entities 105, such as gNBs, that communicate with user equipments (UEs) 115. The UE 115 may operate in a single transmission and reception point (TRP) mode, such that the UE 115 may communicate uplink or downlink signals with a single TRP (e.g., network entity 105) via a single beam. Additionally, the UE 115 may operate in a multiple TRP (mTRP) mode, such that the UE 115 may simultaneously communicate uplink or downlink signals with two different TRPs (e.g., network entities 105) via two different beams. The multiple independent network entities 105 may perform as multiple independent TRPs. Scheduling communications with the UE 115 may be independent between the independent TRPs (e.g., network entities 105), and the UE 115 may have simultaneous transmission and simultaneous reception capability. If one independent TRP (e.g., network entity 105) schedules the UE 115 to transmit and another independent TRP (e.g., network entity 105) schedules, at the same time, the UE 115 to receive, there may be an uplink downlink collision, and the independent scheduling of the independent TRPs (e.g., network entities 105) may fail.

To allow independent scheduling by a first TRP (e.g., first network entity 105) and a second TRP (e.g., second network entity 105) for a UE 115 operable in the mTRP mode, a semi-static time division duplex (TDD) pattern may include a set of downlink symbols, a set of uplink symbols and a set of flexible symbols, and a portion of the flexible symbols may be dedicated for communications with the first TRP (e.g., first network entity 105). Additionally, a portion of the set of flexible symbols may be dedicated for uplink communications or downlink communications or a combination thereof for communications with either the first TRP (e.g., first network entity 105) or the second TRP (e.g., second network entity 105). In some cases, a portion of the set of flexible symbols may be dedicated for communications with the second TRP (e.g., second network entity 105). In some examples, the semi-static TDD pattern may indicate a guard symbol separating one of the flexible symbol dedicated to the first TRP (e.g., first network entity 105) and one of the flexible symbols dedicated to the first TRP (e.g., first network entity 105). The first TRP (e.g., first network entity 105) may transmit, to the UE 115, control signaling indicating the semi-static TDD pattern. The UE 115 may communicate one or more messages with the first TRP (e.g., first network entity 105) and the second TRP (e.g., second network entity 105) in accordance with the semi-static TDD pattern. In some examples, the first TRP (e.g., first network entity 105) and the second TRP (e.g., first network entity 105) may consider load balancing with the flexible symbols of the first UE 115 being dedicated for communications with the first TRP (e.g., first network entity 105), and the flexible symbols of a second UE 115 being dedicated for communications with the second TRP (e.g., second network entity 105).

Figure 2:
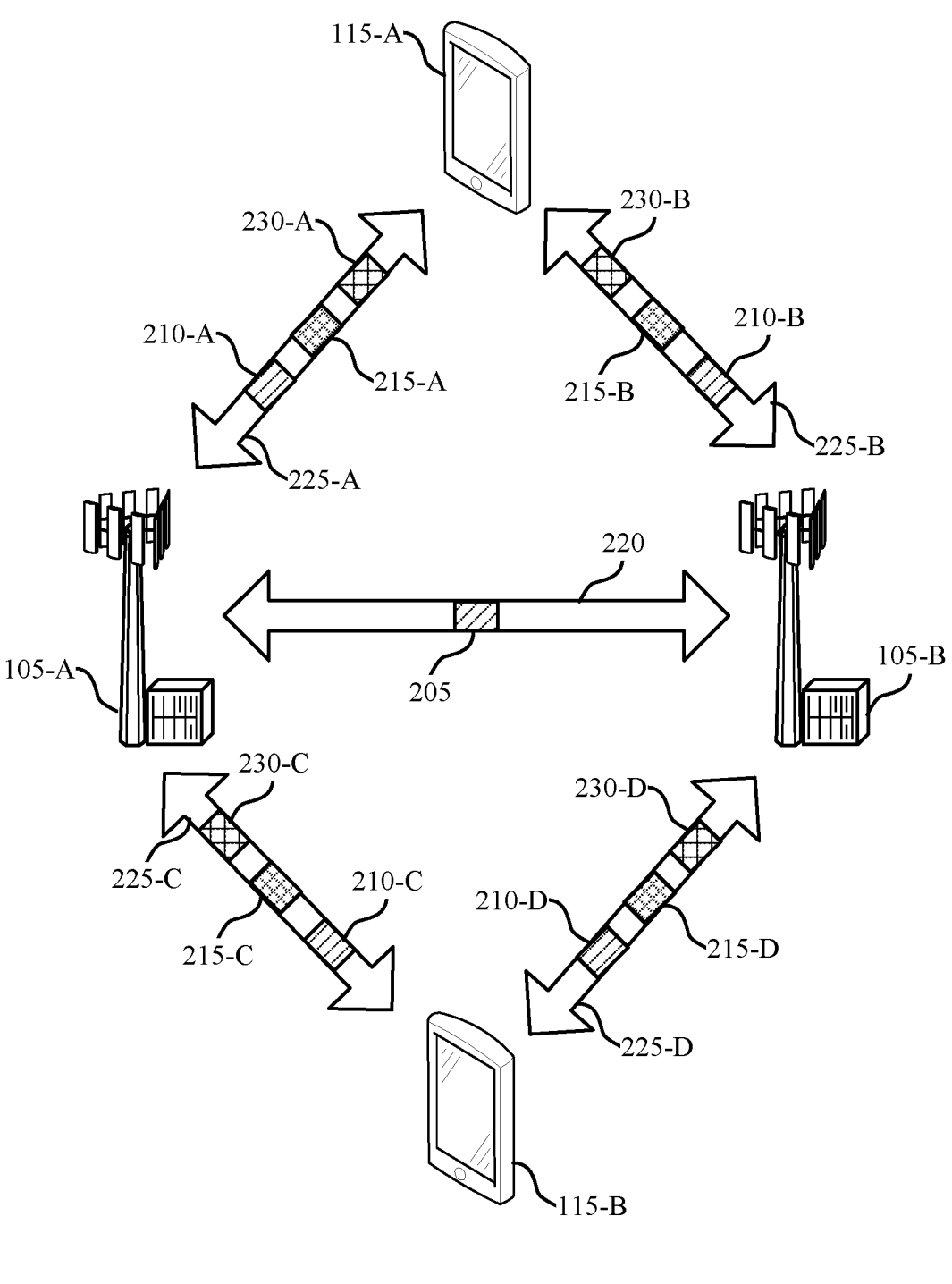
FIG. 2 shows an example of a wireless communications system that supports techniques for dynamic TDD with independent TRPs in accordance with one or more aspects of the present disclosure.

FIG. 2 shows an example of a wireless communications system 200 that supports techniques for dynamic TDD with independent TRPs in accordance with one or more aspects of the present disclosure. Aspects of the wireless communications system 200 may implement, or be implemented by, aspects of wireless communications system 100. For example, the wireless communications system 200 may support signaling and configurations that support techniques for dynamic TDD with independent TRPs, as described previously herein.

The wireless communications system 200 may include a first TRP 105-A, a second TRP 105-B, a first UE 115-A, and a second UE 115-B. The first TRP 105-A and the second TRP 105-B may be examples of network entities 105 as described with reference to FIG. 1. The first UE 115-A and the second UE 115-B may be examples of UEs 115 as described with reference to FIG. 1.

In some aspects, the first TRP 105-A may communicate with the first UE 115-A via a communication link 225-A. In some cases, the communication link 225-A may include an example of an access link (e.g., a Uu link) or a link of an Xn interface. The communication link 225-A may include a bi-Directional link that can include both uplink and downlink communication. For example, the first UE 115-A may transmit uplink transmissions, such as uplink control signals or uplink data signals, to the first TRP 105-A using the communication link 225-A, and the first TRP 105-A may transmit downlink transmissions, such as downlink control signals or downlink data signals, to the first UE 115-A using the communication link 225-A. For example, the first TRP 105-A may transmit control signaling 210-A and scheduling information 215-A to the first UE 115-A, and the first TRP 105-A may communicate one or more messages 230-A, such as data transmissions, with the first UE 115-A.

Similarly, the first UEs 115-A may communicate with the second TRP 105-B via communication link 225-B, the second UE 115-B may communicate with the first TRP 105-A via communication link 225-C, and the second UE 115-B may communicate with the second TRP 105-B via communication link 225-D. In some cases, the communication links 225-B, 225-C, and 225-D may include examples of access links (e.g., Uu links). In some examples, the second TRP 105-B may transmit control signaling 210-B and scheduling information 215-B to the first UE 115-A, and the second TRP 105-B may communicate one or more messages 230-B, such as data transmissions, with the first UE 115-A. The first TRP 105-A may transmit control signaling 210-C and scheduling information 215-C to the second UE 115-B, and the first TRP 105-A may communicate one or more messages 230-C, such as data transmissions, with the second UE 115-B. The second TRP 105-B may transmit control signaling 210-D and scheduling information 215-D to the second UE 115-B, and the second TRP 105-B may communicate one or more messages 230-D, such as data transmissions, with the second UE 115-B.

In some examples, the first TRP 105-A and the second TRP 105-B may provide mTRP features. For example, the first TRP 105-A and the second TRP may be capable of performing simultaneous communication with the first UE 115-A and the second UE 115-B. In some examples, the first UE 115-A may operate in an mTRP mode with the first TRP 105-A and the second TRP 105-B. For example, in the mTRP mode, the first UE 115-A may be capable of performing simultaneous communication with the first TRP 105-A and the second TRP 105-B. In some examples, the second UE 115-B may operate in an mTRP mode with the first TRP 105-A and the second TRP 105-B. For instance, the second UE 115-B may be capable of performing simultaneous communication with the first TRP 105-A and the second TRP 105-B.

The first TRP 105-A and the second TRP 105-B may be examples of the network entities 105, such as gNBs. Some per cell operation gNBs that rely on no cooperation with other gNBs to serve UEs 115 may be modified to introduce mTRP features. For example, previously deployed gNBs may be provided software upgrades to introduce mTRP features. In some examples, fast backhaul signaling between the gNBs may not be used. The gNBs without the fast backhaul signaling may be considered independent TRPs or poor man's TRPs.

In some examples, the first TRP 105-A may communicate with the second TRP 105-B via a communication link 220. In some cases, the communication link 220 may be or include one or more wired links (e.g., an electrical link, an optical fiber link), one or more wireless links (e.g., a radio link, a wireless optical link), among other examples or various combinations thereof. The communication link 220 may include a bi-Directional link. For example, the first TRP 105-A may transmit control signaling 205 to the second TRP 105-B using the communication link 220, and the second TRP 105-B may transmit control signaling to the first TRP 105-A using the communication link 220. In some aspects, the first TRP 105-A may transmit control signaling 205 to the second TRP 105-B using the communication link 220 without using fast backhaul signaling.

The first TRP 105-A and the second TRP 105-B may provide mTRP features without tight coordination between the first TRP 105-A and the second TRP 105-B. In some examples, scheduling communications with the first UE 115-A and the second UE 115-B may be independent between the first TRP 105-A and the second TRP 105-B. The first UE 115-A and the second UE 115-B may have simultaneous transmission and reception capability with multiple TRPs, such as the first TRP 105-A and the second TRP 105-B. For example, the first UE 115-A and the second UE 115-B may be capable of simultaneous physical uplink shared channel (PUSCH) and physical uplink control channel (PUCCH) communications, simultaneous physical downlink shared channel (PDSCH) and PDSCH communications, simultaneous PUCCH and PUCCH communications, and simultaneous PUSCH and PUSCH communications. In some examples, the first TRP 105-A and the second TRP 105-B may provide multiple DCI (mDCI) with separate codebook to the first UE 115-A and the second UE 115-B.

If the first TRP 105-A schedules the first UE 115-A to transmit a first signal and the second TRP 105-B schedules, at the same time, the first UE 115-A to receive a second signal, an uplink downlink collision may occur and the independent scheduling of the independent TRPs may fail. To allow independent scheduling by the first TRP 105-A and the second TRP 105-B for the first UE 115-A operable in the mTRP mode, first TRP 105-A and the second TRP 105-B may align a semi-static TDD pattern between the first TRP 105-A and the second TRP 105-B for the first UE 115-A.

In one example, the semi-static TDD pattern may include a set of uplink symbols and a set of downlink symbols, and the uplink symbols and downlink symbols are configured between the first TRP 105-A and the second TRP 105-B. Providing the semi-static TDD pattern with the set of uplink symbols and the set of downlink symbols may be typical for TDD spectrum operations.

In some examples, the semi-static TDD pattern may include a set of uplink symbols, a set of downlink symbols, and a set of flexible symbols available for uplink or downlink communications. Configuring the uplink symbols and downlink symbols between the first TRP 105-A or the second TRP 105-B may reduce flexibility. For example, with the semi-static TDD pattern, all of the flexible symbols may not be available for uplink or downlink communications when traffic exceeds available uplink symbols or downlink symbols. In another example, the first TRP 105-A or the second TRP 105-B may coordinate the uplink or downlink direction for flexible symbols dynamically, and the dynamic coordination may use a fast backhaul.

In some examples, the first TRP 105-A and the second TRP 105-B may operate as independent TRPs and may implement a dynamic TDD system with mTRP operation using the flexible symbols of the semi-static TTD pattern. For example, the semi-static TDD pattern may include a set of uplink symbols, a set of downlink symbols, and a set of flexible symbols. For the flexible symbols, one TRP, such as the first TRP 105-A, may use all of the flexible symbols in either the downlink or uplink direction, and the second TRP 105-B may not use the set of flexible symbols. The first UE 115-A may operate in the mTRP mode (downlink or uplink) in the downlink symbols or the uplink symbols and may operate in the single TRP mode (downlink or uplink) in the semi-static flexible symbols. Assigning the flexible symbols for single TRP operation prioritizes the dynamic TDD over the mTRP operation. The dynamic TDD and mTRP may not be used at the same time. For a slot dynamic TDD enable, mTRP may not be supported with only one TRP making decisions.

Figure 3:
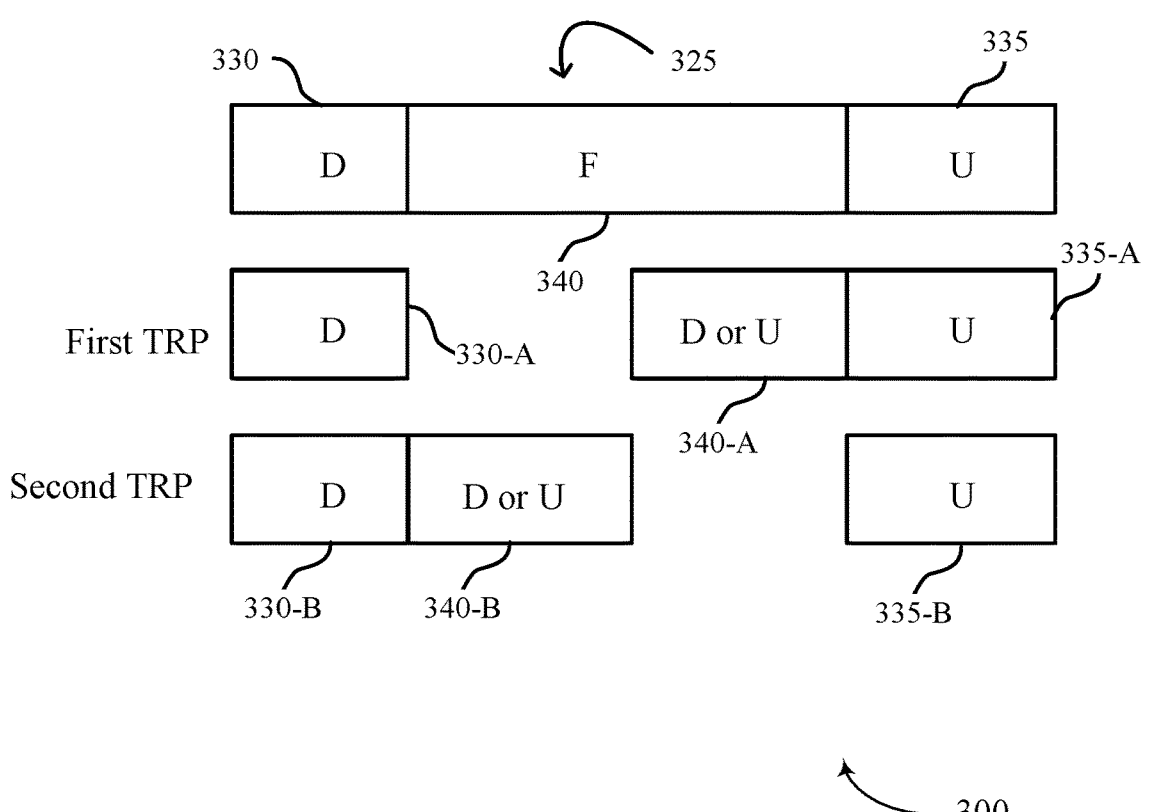
FIG. 3 shows examples of semi-static TDD patterns that supports techniques for dynamic TDD with independent TRPs in accordance with one or more aspects of the present disclosure.

FIG. 3 shows examples of semi-static TDD patterns 300 that supports techniques for dynamic TDD with independent TRPs in accordance with one or more aspects of the present disclosure. In some examples, the semi-static TDD patterns 300 may implement one or more aspects of the wireless communications system 100 and the wireless communications system 200.

In one example, a semi-static TDD pattern 305 may include a set of downlink symbols 310, a set of uplink symbols 315, and a set of flexible symbols 320. For the semi-static TDD pattern 305, only the second TRP 105-B may use the set of flexible symbols 320 in either the downlink or uplink direction, and the first TRP 105-A may not use the set of flexible symbols 320. The first TRP 105-A may operate in the mTRP mode in the downlink symbols 310-A and the uplink symbols 315-A. The second TRP 105-B may operate in the mTRP mode in the downlink symbols 310-B and uplink symbols 315-B, and the second TRP 105-B may operate in the single TRP mode in either the uplink or downlink direction in the flexible symbols 320-B.

Figure 4:
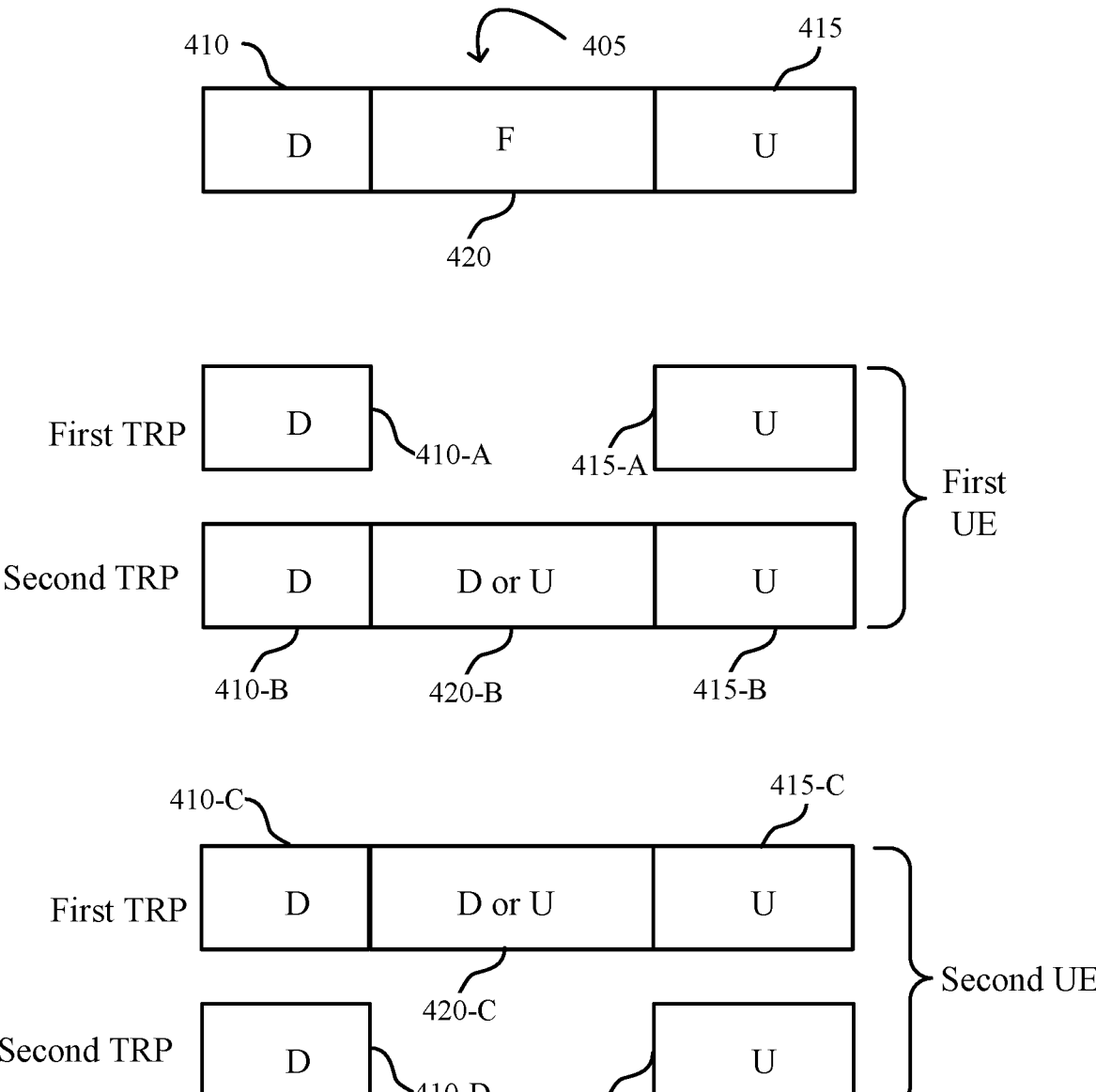
FIG. 4 shows an example of a semi-static TDD pattern that supports techniques for dynamic TDD with independent TRPs in accordance with one or more aspects of the present disclosure.

In another example, a semi-static TDD pattern 325 may include a set of downlink symbols 330, a set of uplink symbols 335, and a set of flexible symbols 340. For the semi-static TDD pattern 325, a portion of the set of flexible symbols 340 may be used by the first TRP 105-A and the remaining portion of the set of flexible symbols 340 may be used by the second TRP 105-B. The first TRP 105-A may operate in the mTRP mode in the downlink symbols 330-A and the uplink symbols 335-A, and the second TRP 105-B may operate in the mTRP mode in the downlink symbols 330-B and uplink symbols 335-B. The first TRP 105-A may use the portion of the flexible symbols 340-A in either the uplink or downlink direction, and the second TRP 105-B may use the portion of the flexible symbols 340-B in either the uplink or downlink direction FIG. 4 shows an example of a semi-static TDD pattern 400 that supports techniques for dynamic TDD with independent TRPs in accordance with one or more aspects of the present disclosure. In some examples, the semi-static TDD patterns 400 may implement one or more aspects of the wireless communications system 100 and the wireless communications system 200.

In some examples, the first TRP 105-A and the second TRP 105-B may coordinate for load balancing considerations; a load may be a processing load at the first TRP 105-A and the second TRP 105-B. For example, first TRP 105-A and the second TRP 105-B may coordinate to define a first semi-static TDD pattern for the first UE 115-A and a second semi-static TDD pattern for the second UE 115-B. The first TRP 105-A and the second TRP 105-B may coordinate the dedication of the set of flexible symbols of the first semi-static TDD pattern and the second semi-static TDD pattern to either the first TRP 105-A and the second TRP 105-B considering processing load at the first TRP 105-A and the second TRP 105-B. For example, different TRPs may control the flexible symbols of different UEs to balance the TRP load. An example of the load balancing by assigning the flexible symbols of different UEs to different TRPs may be illustrated in FIG. 4.

Referring to FIG. 4, a semi-static TDD pattern 405 may include a set of downlink symbols 410, a set of uplink symbols 415, and a set of flexible symbols 420. In some examples, the first semi-static TDD pattern for the first UE 115-A may include a set of downlink symbols, a set of uplink symbols, and a set of flexible symbols similar to the semi-static TDD pattern 405, and a second semi-static TDD pattern for the second UE 115-B may include a set of downlink symbols, a set of uplink symbols, and a set of flexible symbols similar to the semi-static TDD pattern 405.

In one example, for the first semi-static TDD pattern for the first UE 115-A, only the second TRP 105-B may use the set of flexible symbols 420 in either the downlink or uplink direction, and the first TRP 105-A may not use the set of flexible symbols 420. The first TRP 105-A may operate in the mTRP mode in the downlink symbols 410-A and the uplink symbols 415-A. The second TRP 105-B may operate in the mTRP mode in the downlink symbols 410-B and uplink symbols 415-B, and the second TRP 105-B may operate in the single TRP mode in either the uplink or downlink direction in the flexible symbols 420-B.

For the second semi-static TDD pattern for the second UE 115-B, only the first TRP 105-A may use the set of flexible symbols 420 in either the downlink or uplink direction, and the second TRP 105-B may not use the set of flexible symbols 420. The second TRP 105-B may operate in the mTRP mode in the downlink symbols 410-D and the uplink symbols 415-D. The first TRP 105-A may operate in the mTRP mode in the downlink symbols 410-C and uplink symbols 415-C, and the first TRP 105-A may operate in the single TRP mode in either the uplink or downlink direction in the flexible symbols 420-C. The first semi-static TDD pattern and the second semi-static TDD pattern may keep the first TRP 105-A and the second TRP 105-B operating with dynamic TDD.

In some examples, the first TRP 105-A and the second TRP 105-B may communicate control signaling 205 via the communication link 220 for load balancing. For example, the first TRP 105-A may transmit, to the second TRP 105-B, control signaling indicating a processing load at the first TRP 105-A. In some examples, the first TRP 105-A may transmit, to the second TRP 105-B, control signaling indicating the first semi-static TDD pattern and/or the second semi-static TDD pattern.

Figure 5:
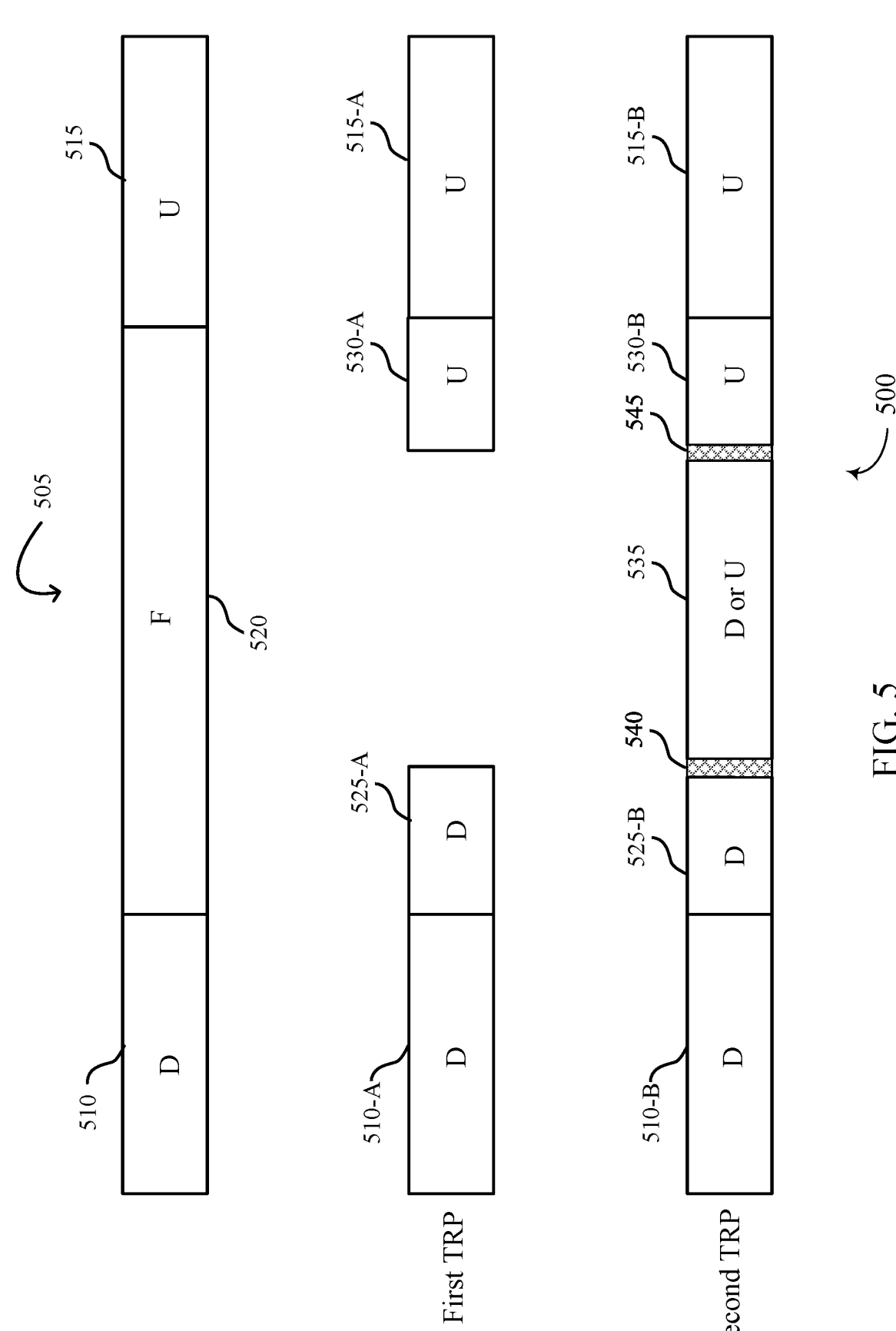
FIG. 5 shows an example of a semi-static TDD pattern that supports techniques for dynamic TDD with independent TRPs in accordance with one or more aspects of the present disclosure.

FIG. 5 shows an example of a semi-static TDD pattern 500 that supports techniques for dynamic TDD with independent TRPs in accordance with one or more aspects of the present disclosure. In some examples, the semi-static TDD pattern 500 may implement one or more aspects of the wireless communications system 100 and the wireless communications system 200. In some examples, the semi-static TDD pattern 500 may provide techniques for switching gap handling for transitions between downlink and uplink symbols.

In some examples, instead of restricting all mTRP operation in the semi-static downlink symbols or uplink symbols and using single TRP mode in all of the flexible symbols, a portion of the flexible symbols may be dedicated as downlink symbols and uplink symbols. Dedicating a portion of the flexible symbols as downlink and uplink symbols may provide improve mTRP operation while reducing some of the dynamic TDD operation benefit.

In some examples, within the set of flexible symbols of the semi-static TDD pattern, some flexible symbols may be dedicated as uplink symbols or downlink symbols known to both the first TRP 105-A and the second TRP 105-B, and mTRP operation may be allowed over the flexible symbols dedicated as uplink symbols or downlink symbols. For this example, the remaining flexible symbols may be single TRP operation and may be allocated to one of the TRPs or may be divided between the first TRP 105-A and the second TRP 105-B. In one example, the dedication of the flexible symbols to uplink symbols or downlink symbols may be performed at the RRC level with legacy UE specific TDD configuration. In another example, the dedication of the flexible symbols to uplink symbols or downlink symbols may be via MAC-CE based indication to dynamically change the dedication.

In one example, all of the flexible symbols may be dedicated to uplink symbols or downlink symbols which may be similar to legacy arrangement without any flexible symbols. In another example, none of the flexible symbols may be dedicated to uplink symbols or downlink symbols providing single TRP operation over all of the flexible symbols.

Referring to FIG. 5, a semi-static TDD pattern 505 for the first UE 115-A may include a set of downlink symbols 510, a set of uplink symbols 515, and a set of flexible symbols 520. In one example, a portion of the set of flexible symbols 520 may be dedicated as downlink symbols (e.g., downlink symbols 525-A and downlink symbols 525-B) and a portion of the set of flexible symbols 520 may be dedicated as uplink symbols (e.g., uplink symbols 530-A and uplink symbols 530-B). The remaining flexible symbols 535 of the set of flexible symbols 520 may be used by only the second TRP 105-B in either the downlink or uplink direction, and the first TRP 105-A may not use remaining flexible symbols. The first TRP 105-A may operate in the mTRP mode in the downlink symbols 510-A, the downlink symbols 525-A, the uplink symbols 530-A and the uplink symbols 515-A. The second TRP 105-B may operate in the mTRP mode in the downlink symbols 510-B, the downlink symbols 525-B, the uplink symbols 530-B, and the uplink symbols 515-B, and the second TRP 105-B may operate in single TRP mode in either the uplink or downlink direction in the portion of the flexible symbols 535.

In some examples, the semi-static TDD pattern may include guard symbols when one TRP does not know a direction of communication the other TRP may assign to the UE in the set of flexible symbols. For example, referring to FIG. 5, guard symbols 540 and 545 may be included in the set of the flexible symbols of the semi-static TDD pattern. The guard symbol 540 for the case of the first TRP 105-A may not know what direction the second TRP 105-B will assign for the first flexible symbol 535. In one example, the second TRP 105-B may assign an uplink communication for the first UE 115-A starting at the beginning of the flexible symbols 535 immediately after the first TRP 105-A and may assign a downlink communication in the last symbol of the downlink symbols 525-A, which may be possible due to a timing advance offset. The guard symbol 545 may be for the case of the first TRP 105-A may not know what direction the second TRP 105-B will assign for the last flexible symbol 535. For example, the second TRP 105-B may assign a downlink communication for the first UE 115-A at the end of the flexible symbols 535 immediately prior to the first TRP 105-A and may assign an uplink communication in the first symbol of the uplink symbols 530-A. In another example, the semi-static TDD pattern may indicate a guard symbol separating one of the flexible symbols dedicated to the first TRP 105-A and one of the flexible symbols dedicated to the second TRP 105-B.

Figure 6:
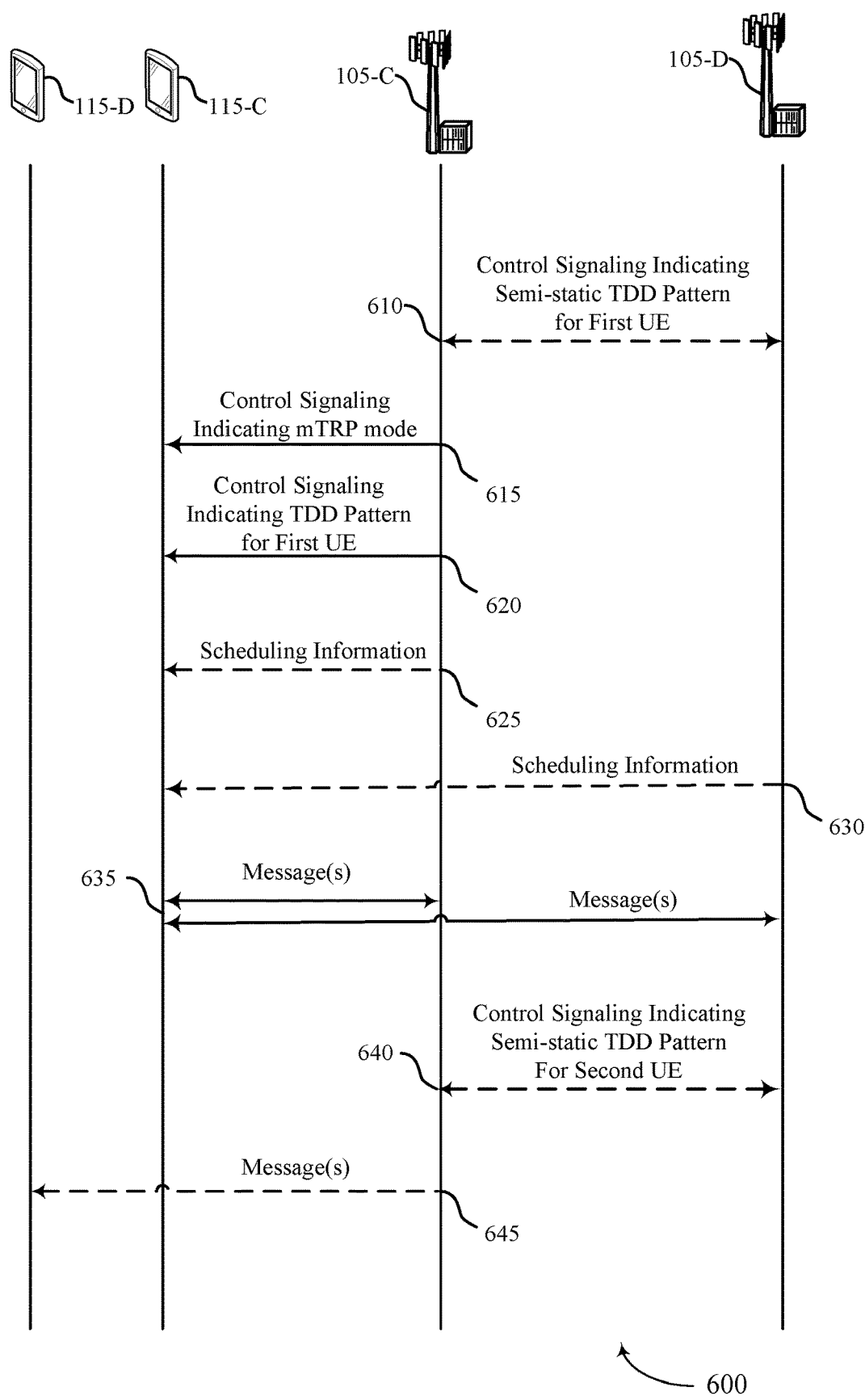
FIG. 6 shows an example of a process flow that supports techniques for dynamic TDD with independent TRPs in accordance with one or more aspects of the present disclosure.

FIG. 6 shows an example of a process flow 600 that supports techniques for dynamic TDD with independent TRPs in accordance with one or more aspects of the present disclosure. Aspects of the process flow 600 may implement, or be implemented by, aspects of wireless communications system 100 and the wireless communications system 200, or any combination thereof. For example, the process flow 600 illustrates signaling and configurations that enable dynamic TDD with independent TRPs, as described previously herein.

The process flow 600 includes a first TRP 105-C, a second TRP 105-D, a first UE 115-C, and a second UE 115-D, which may be examples of UEs 115, network entities 105, first TRP 105-A or second TRP 105-B, and other wireless devices as described herein. For example, the first TRP 105-C and the second TRP 105-D illustrated in FIG. 6 may include examples of the first TRP 105-A and the second TRP 105-B, as illustrated in FIG. 2. Similarly, the first UE 115-C and the second UE 115-D illustrated in FIG. 6 may include examples of the first UE 115-A and the second UE 115-B as illustrated in FIG. 2.

In some examples, the operations illustrated in process flow 600 may be performed by hardware (e.g., including circuitry, processing blocks, logic components, and other components), code (e.g., software executed by a processor), or any combination thereof. Alternative examples of the following may be implemented, where some steps are performed in a different order than described or are not performed at all. In some cases, steps may include additional features not mentioned below, or further steps may be added.

At 610, optionally, the first TRP 105-C may communicate, with the second TRP 105-D, control signaling indicating a semi-static TDD pattern for the first UE 115-C. In one example, the first TRP 105-C may transmit, to the second TRP 105-D, the control signaling indicating the semi-static TDD pattern for the first UE 115-C. In another example, the second TRP 105-D may transmit, to the first TRP 105-C, the control signaling indicating the semi-static TDD pattern for the first UE 115-C.

At 615, the first TRP 105-C may transmit, to the first UE 115-C, first control signaling indicating operation in an mTRP mode.

At 620, the first TRP 105-C may transmit, to the first UE 115-C, second control signaling indicating the semi-static TDD pattern. The semi-static TDD pattern may include a set of downlink symbols, a set of uplink symbols and a set of flexible symbols. In some examples, one or more flexible symbols of the set of flexible symbols may be dedicated for communications with the first TRP 105-C. In some examples, one or more flexible symbols of the set of flexible symbols may be dedicated for communications with the second TRP 105-D. In some examples, one or more flexible symbols of the set of flexible symbols of the semi-static TDD pattern may be dedicated for uplink communications or one or more flexible symbols of the set of flexible symbols of the semi-static TDD pattern may be dedicated for downlink communications or a combination thereof. In some examples, the semi-static TDD pattern may include a guard symbol between the one or more flexible symbols of the set of flexible symbols dedicated for communications with the first TRP 105-C and the one or more second flexible symbols of the set of flexible symbols dedicated for communications with the second TRP 105-D.

At 625, optionally, the first TRP 105-C may transmit, to the first UE 115-C, first scheduling information in accordance with the semi-static TDD pattern. In some examples, the set of flexible symbols may be scheduled for communications with the first TRP 105-C.

At 630, optionally, the second TRP 105-D may transmit, to the first UE 115-C, second scheduling information in accordance with the semi-static TDD pattern. In some examples, one or more uplink symbols of the set of uplink symbols may be scheduled for communications with the second TRP 105-D, one or more downlink symbols of the set of downlink symbols may be scheduled for communications with the second TRP 105-D, one or more flexible symbols of the one or more second flexible symbols may be scheduled for communications with the second TRP 105-D, or a combination thereof.

At 635, the first UE 115-C may communicate, with first TRP 105-C and the second TRP 105-D, one or more messages in accordance with the first control signaling and the semi-static TDD pattern. In some examples, the first UE 115-C may communicate a first message of the one or more messages with the first TRP 105-C in accordance with the first scheduling information. In some examples, the first UE 115-C may communicate a second message of the one or more messages with the second TRP 105-D in accordance with the second scheduling information and the semi-static TDD pattern.

At 640, optionally, the first TRP 105-C may communicate, with the second TRP 105-D, third control signaling indicating a second semi-static TDD pattern for the second UE 115-D. In some examples, the second semi-static TDD pattern may include a set of downlink symbols, a set of uplink symbols and a set of flexible symbols dedicated for communications between a second UE and the second TRP.

At 645, optionally, the first TRP 105-C may communicate, with the second UE 115-D, one or more messages in accordance with the second semi-static TDD pattern.

Figure 7:
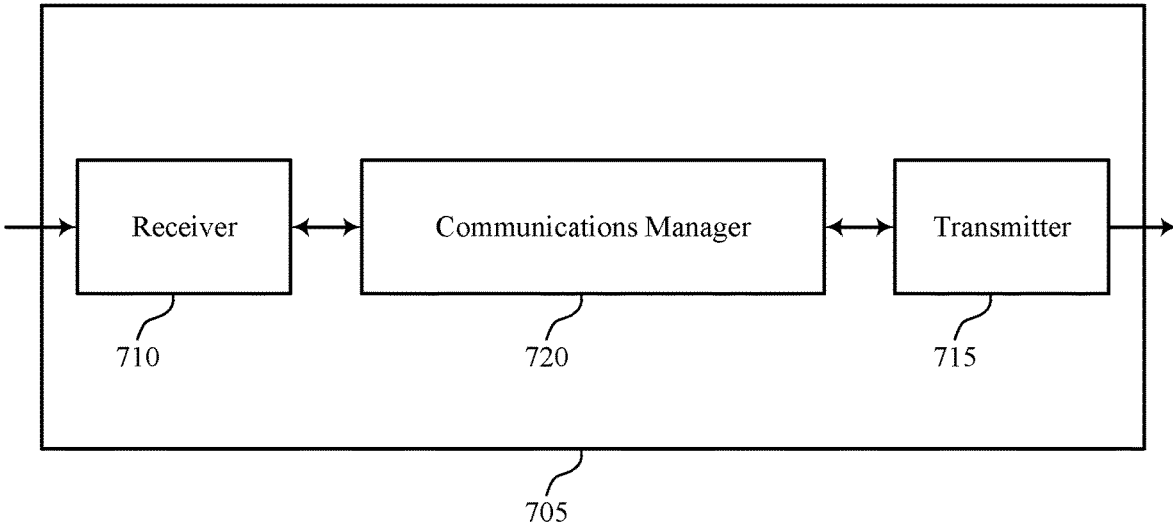
FIGS. 7 and 8 show block diagrams of devices that support techniques for dynamic TDD with independent TRPs in accordance with one or more aspects of the present disclosure.

FIG. 7 shows a block diagram 700 of a device 705 that supports techniques for dynamic TDD with independent TRPs in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for dynamic TDD with independent TRPs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for dynamic TDD with independent TRPs). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for dynamic TDD with independent TRPs as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 is capable of, configured to, or operable to support a means for receiving first control signaling indicating operation in a multiple TRP (TRP) mode. The communications manager 720 is capable of, configured to, or operable to support a means for receiving, from a first TRP, second control signaling indicating a semi-static TDD pattern, where the semi-static TDD pattern including a set of downlink symbols, a set of uplink symbols and a set of flexible symbols, and where one or more flexible symbols of the set of flexible symbols are dedicated for communications with the first TRP. The communications manager 720 is capable of, configured to, or operable to support a means for communicating one or more messages with the first TRP and a second TRP in accordance with the first control signaling and the semi-static TDD pattern.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources.

Figure 8:
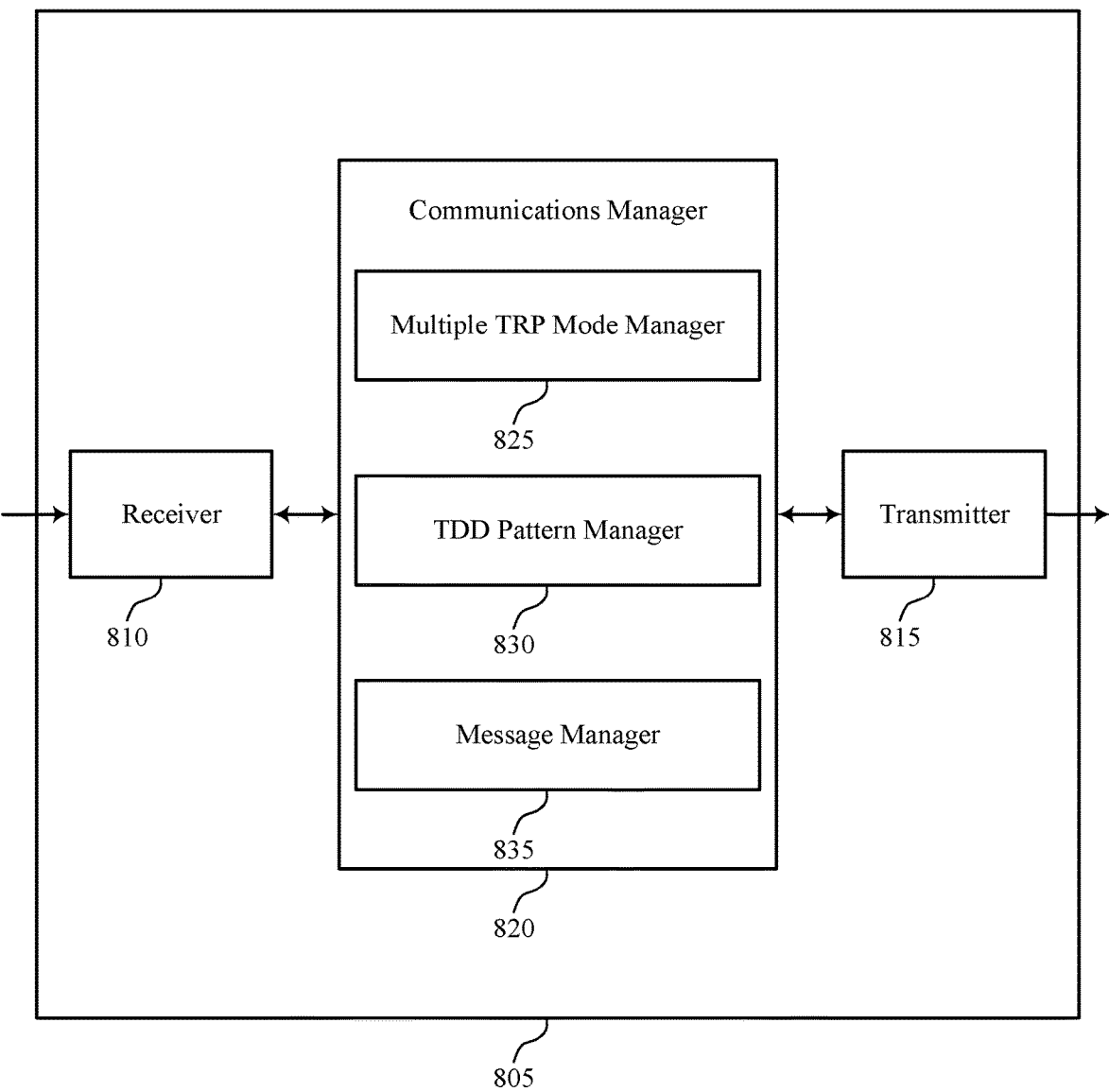

FIG. 8 shows a block diagram 800 of a device 805 that supports techniques for dynamic TDD with independent TRPs in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for dynamic TDD with independent TRPs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for dynamic TDD with independent TRPs). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for dynamic TDD with independent TRPs as described herein. For example, the communications manager 820 may include a multiple TRP mode manager 825, a TDD pattern manager 830, a message manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The multiple TRP mode manager 825 is capable of, configured to, or operable to support a means for receiving first control signaling indicating operation in a mTRP mode. The TDD pattern manager 830 is capable of, configured to, or operable to support a means for receiving, from a first TRP, second control signaling indicating a semi-static TDD pattern, where the semi-static TDD pattern includes a set of downlink symbols, a set of uplink symbols and a set of flexible symbols, and where one or more flexible symbols of the set of flexible symbols are dedicated for communications with the first TRP. The message manager 835 is capable of, configured to, or operable to support a means for communicating one or more messages with the first TRP and a second TRP in accordance with the first control signaling and the semi-static TDD pattern.

Figure 9:
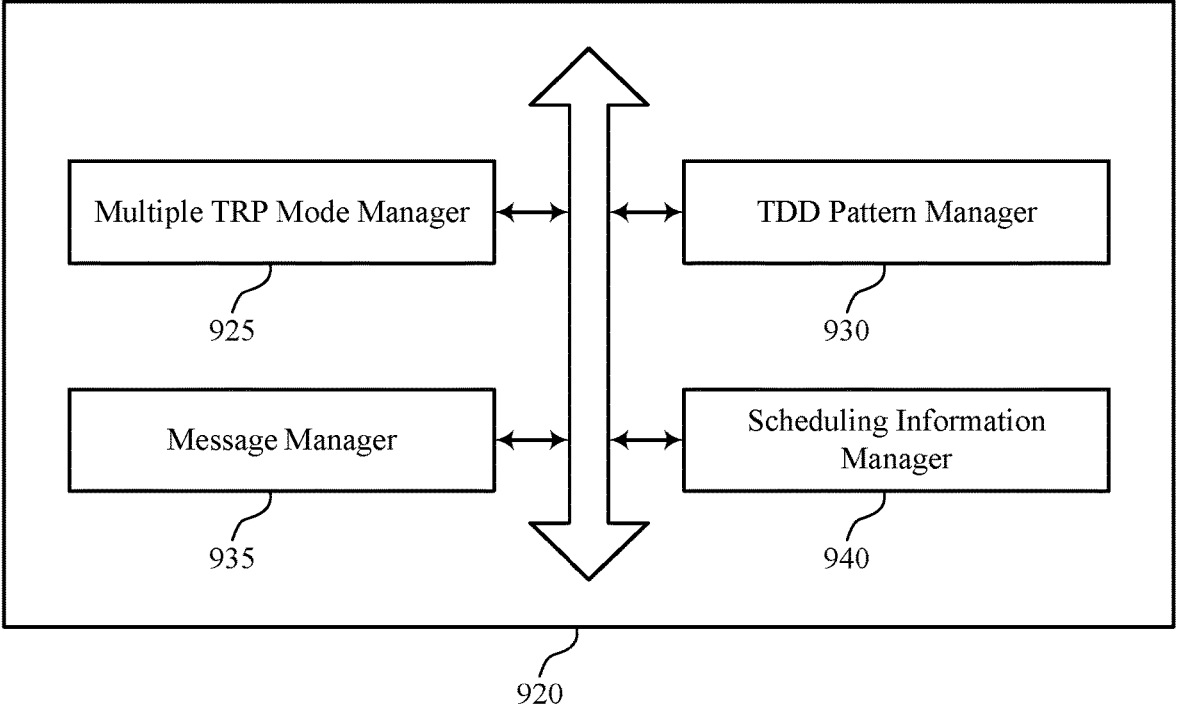
FIG. 9 shows a block diagram of a communications manager that supports techniques for dynamic TDD with independent TRPs in accordance with one or more aspects of the present disclosure.

FIG. 9 shows a block diagram 900 of a communications manager 920 that supports techniques for dynamic TDD with independent TRPs in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for dynamic TDD with independent TRPs as described herein. For example, the communications manager 920 may include a multiple TRP mode manager 925, a TDD pattern manager 930, a message manager 935, a scheduling information manager 940, or any combination thereof. Each of these components may communicate, directly or indirectly, with one another (e.g., via one or more buses).

The communications manager 920 may support wireless communications at a UE in accordance with examples as disclosed herein. The multiple TRP mode manager 925 is capable of, configured to, or operable to support a means for receiving first control signaling indicating operation in a mTRP mode. The TDD pattern manager 930 is capable of, configured to, or operable to support a means for receiving, from a first TRP, second control signaling indicating a semi-static TDD pattern, where the semi-static TDD pattern includes a set of downlink symbols, a set of uplink symbols and a set of flexible symbols, and where one or more flexible symbols of the set of flexible symbols are dedicated for communications with the first TRP. The message manager 935 is capable of, configured to, or operable to support a means for communicating one or more messages with the first TRP and a second TRP in accordance with the first control signaling and the semi-static TDD pattern.

In some examples, the scheduling information manager 940 is capable of, configured to, or operable to support a means for receiving, from the first TRP, first scheduling information in accordance with the semi-static TDD pattern, where the set of flexible symbols are scheduled for communications with the first TRP. In some examples, the message manager 935 is capable of, configured to, or operable to support a means for communicating a first message of the one or more messages with the first TRP in accordance with the first scheduling information.

In some examples, the scheduling information manager 940 is capable of, configured to, or operable to support a means for receiving, from the second TRP, second scheduling information in accordance with the semi-static TDD pattern, where one or more uplink symbols of the set of uplink symbols are scheduled for communications with the second TRP, or one or more downlink symbols of the set of downlink symbols are scheduled for communications with the second TRP, or a combination thereof. In some examples, the message manager 935 is capable of, configured to, or operable to support a means for communicating a second message of the one or more messages with the second TRP in accordance with the second scheduling information and the semi-static TDD pattern.

In some examples, one or more second flexible symbols of the set of flexible symbols are dedicated for communications with the second TRP.

In some examples, the scheduling information manager 940 is capable of, configured to, or operable to support a means for receiving, from the second TRP, second scheduling information in accordance with the semi-static TDD pattern, where one or more uplink symbols of the set of uplink symbols are scheduled for communications with the second TRP, one or more downlink symbols of the set of downlink symbols are scheduled for communications with the second TRP, one or more flexible symbols of the one or more second flexible symbols are scheduled for communications with the second TRP, or a combination thereof. In some examples, the message manager 935 is capable of, configured to, or operable to support a means for communicating a first message of the one or more messages with the second TRP in accordance with the second scheduling information and the semi-static TDD pattern.

In some examples, the semi-static TDD pattern includes a guard symbol between the one or more flexible symbols of the set of flexible symbols dedicated for communications with the first TRP and the one or more second flexible symbols of the set of flexible symbols dedicated for communications with the second TRP.

In some examples, one or more flexible symbols of the set of flexible symbols of the semi-static TDD pattern are dedicated for uplink communications or one or more flexible symbols of the set of flexible symbols of the semi-static TDD pattern are dedicated for downlink communications or a combination thereof.

Figure 10:
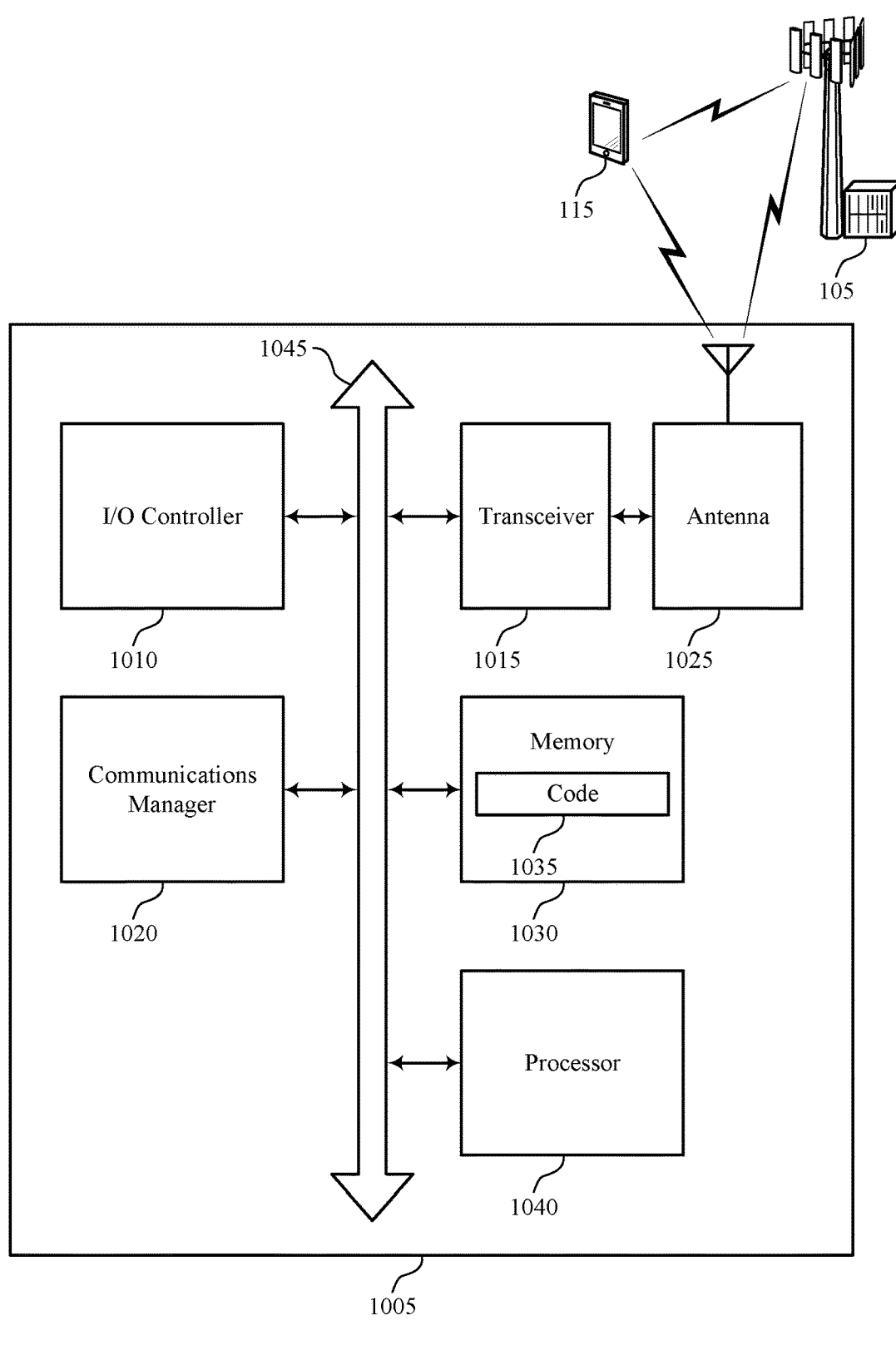
FIG. 10 shows a diagram of a system including a device that supports techniques for dynamic TDD with independent TRPs in accordance with one or more aspects of the present disclosure.

FIG. 10 shows a diagram of a system 1000 including a device 1005 that supports techniques for dynamic TDD with independent TRPs in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-Directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-Directionally, via the one or more antennas 1025, wired, or wireless links as described herein. For example, the transceiver 1015 may represent a wireless transceiver and may communicate bi-Directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for dynamic TDD with independent TRPs). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 is capable of, configured to, or operable to support a means for receiving first control signaling indicating operation in a mTRP mode. The communications manager 1020 is capable of, configured to, or operable to support a means for receiving, from a first TRP, second control signaling indicating a semi-static TDD pattern, where the semi-static TDD pattern includes a set of downlink symbols, a set of uplink symbols and a set of flexible symbols, and where one or more flexible symbols of the set of flexible symbols are dedicated for communications with the first TRP. The communications manager 1020 is capable of, configured to, or operable to support a means for communicating one or more messages with the first TRP and a second TRP in accordance with the first control signaling and the semi-static TDD pattern.

By including or configuring the communications manager 1020 in accordance with examples as described herein, the device 1005 may support techniques for improved communication reliability, reduced latency, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for dynamic TDD with independent TRPs as described herein, or the processor 1040 and the memory 1030 may be otherwise configured to perform or support such operations.

Figure 11:
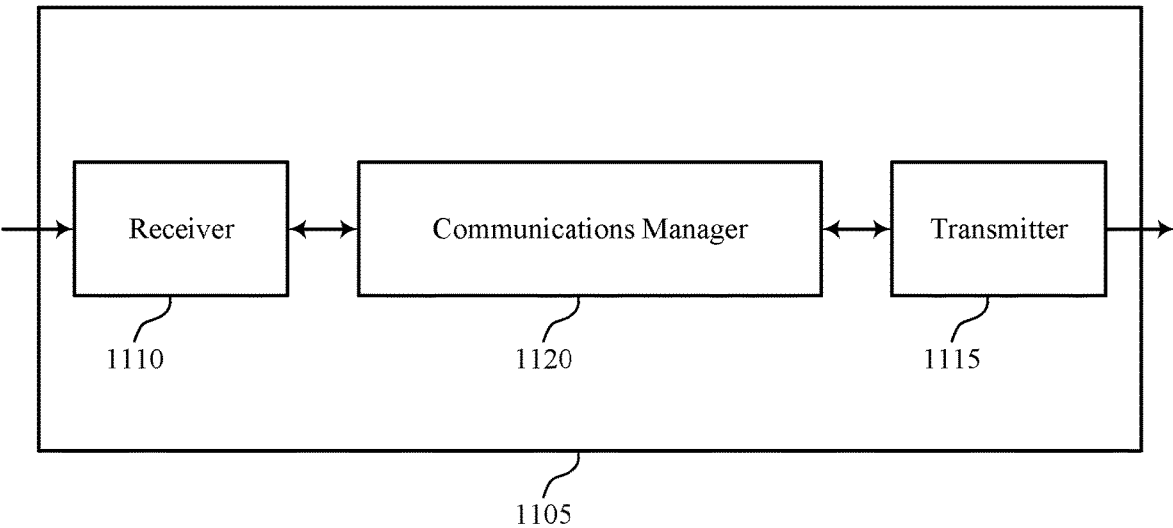
FIGS. 11 and 12 show block diagrams of devices that support techniques for dynamic TDD with independent TRPs in accordance with one or more aspects of the present disclosure.

FIG. 11 shows a block diagram 1100 of a device 1105 that supports techniques for dynamic TDD with independent TRPs in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of techniques for dynamic TDD with independent TRPs as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a first TRP in accordance with examples as disclosed herein. For example, the communications manager 1120 is capable of, configured to, or operable to support a means for transmitting, to a first UE, first control signaling indicating operation in a multiple TRP mode. The communications manager 1120 is capable of, configured to, or operable to support a means for transmitting, to the first UE, second control signaling indicating a semi-static TDD pattern, where the semi-static TDD pattern includes a set of downlink symbols, a set of uplink symbols and a set of flexible symbols, where one or more flexible symbols of the set of flexible symbols are dedicated for communications between the first TRP and the first UE. The communications manager 1120 is capable of, configured to, or operable to support a means for communicating one or more messages with the first UE in accordance with the first control signaling and the semi-static TDD pattern.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for more efficient utilization of communication resources.

Figure 12:
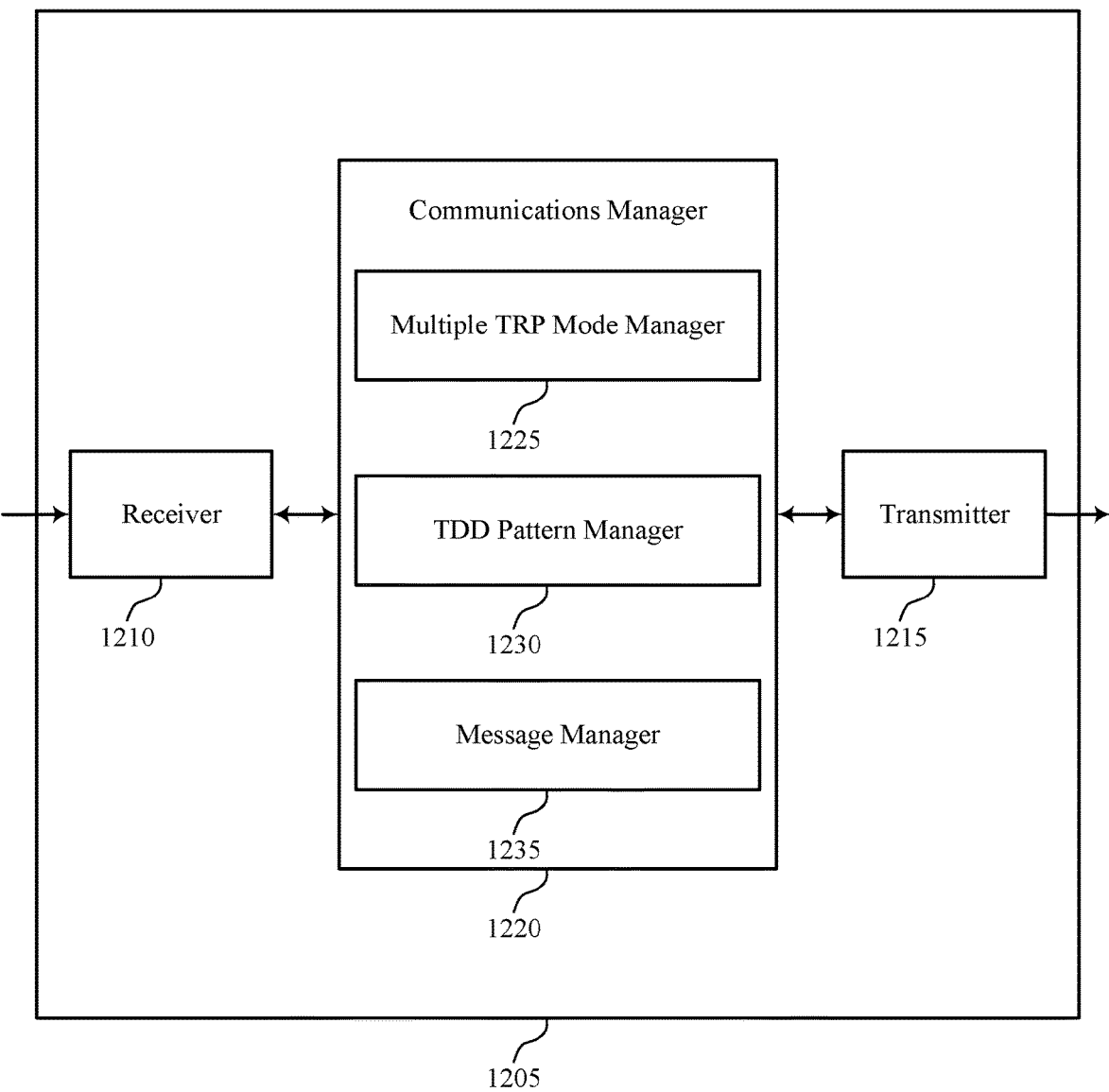

FIG. 12 shows a block diagram 1200 of a device 1205 that supports techniques for dynamic TDD with independent TRPs in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of techniques for dynamic TDD with independent TRPs as described herein. For example, the communications manager 1220 may include a multiple TRP mode manager 1225, a TDD pattern manager 1230, a message manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a first TRP in accordance with examples as disclosed herein. The mTRP mode manager 1225 is capable of, configured to, or operable to support a means for transmitting, to a first UE, first control signaling indicating operation in a mTRP mode. The TDD pattern manager 1230 is capable of, configured to, or operable to support a means for transmitting, to the first UE, second control signaling indicating a semi-static TDD pattern, where the semi-static TDD pattern includes a set of downlink symbols, a set of uplink symbols and a set of flexible symbols, where one or more flexible symbols of the set of flexible symbols are dedicated for communications between the first TRP and the first UE. The message manager 1235 is capable of, configured to, or operable to support a means for communicating one or more messages with the first UE in accordance with the first control signaling and the semi-static TDD pattern.

Figure 13:
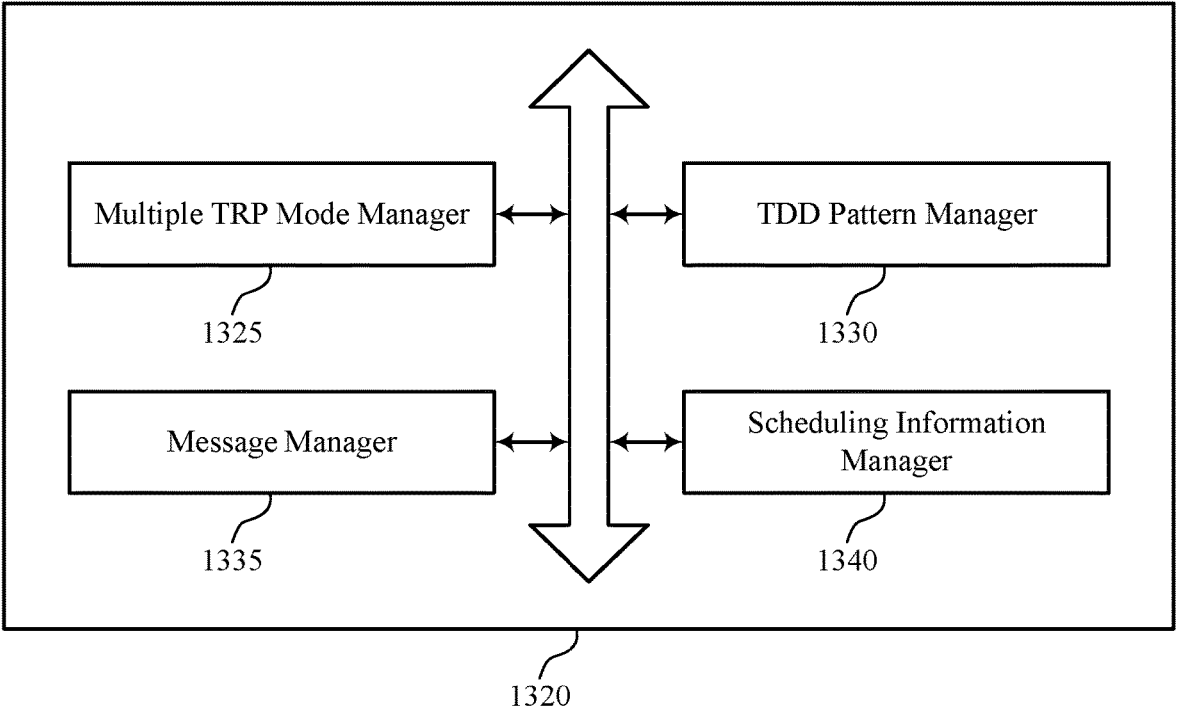
FIG. 13 shows a block diagram of a communications manager that supports techniques for dynamic TDD with independent TRPs in accordance with one or more aspects of the present disclosure.
Figure 13:

FIG. 13 shows a block diagram 1300 of a communications manager 1320 that supports techniques for dynamic TDD with independent TRPs in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for dynamic TDD with independent TRPs as described herein. For example, the communications manager 1320 may include a multiple TRP mode manager 1325, a TDD pattern manager 1330, a message manager 1335, a scheduling information manager 1340, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a first TRP in accordance with examples as disclosed herein. The mTRP mode manager 1325 is capable of, configured to, or operable to support a means for transmitting, to a first UE, first control signaling indicating operation in a multiple TRP mode. The TDD pattern manager 1330 is capable of, configured to, or operable to support a means for transmitting, to the first UE, second control signaling indicating a semi-static TDD pattern, where the semi-static TDD pattern includes a set of downlink symbols, a set of uplink symbols and a set of flexible symbols, where one or more flexible symbols of the set of flexible symbols are dedicated for communications between the first TRP and the first UE. The message manager 1335 is capable of, configured to, or operable to support a means for communicating one or more messages with the first UE in accordance with the first control signaling and the semi-static TDD pattern.

In some examples, the scheduling information manager 1340 is capable of, configured to, or operable to support a means for transmitting, to the first UE, first scheduling information in accordance with the semi-static TDD pattern, where the set of flexible symbols are scheduled for communications between the first TRP and the first UE. In some examples, the message manager 1335 is capable of, configured to, or operable to support a means for communicating a first message of the one or more messages with the first UE in accordance with the first scheduling information.

In some examples, one or more uplink symbols of the set of uplink symbols are available for communications between the first UE and the second TRP, or one or more downlink symbols of the set of downlink symbols are available for communications between the first UE and the second TRP, or a combination thereof.

In some examples, one or more second flexible symbols of the set of flexible symbols are dedicated for communications between the first UE and the second TRP.

In some examples, one or more uplink symbols of the set of uplink symbols are available for communications between the first UE and the second TRP, one or more downlink symbols of the set of downlink symbols are available for communications between the first UE and the second TRP, one or more flexible symbols of the one or more second flexible symbols are available for communications between the first UE and a second TRP, or a combination thereof.

In some examples, the semi-static TDD pattern includes a guard symbol between the one or more flexible symbols of the set of flexible symbols dedicated for communications between the first TRP and the first UE and the one or more second flexible symbols of the set of flexible symbols dedicated for communications between the second TRP and the first UE.

In some examples, one or more flexible symbols of the set of flexible symbols of the semi-static TDD pattern are dedicated for uplink communications or one or more flexible symbols of the set of flexible symbols of the semi-static TDD pattern are dedicated for downlink communications or a combination thereof.

In some examples, the TDD pattern manager 1330 is capable of, configured to, or operable to support a means for communicating, with the second TRP, third control signaling indicating the semi-static TDD pattern.

In some examples, the TDD pattern manager 1330 is capable of, configured to, or operable to support a means for communicating, with the second TRP, third control signaling indicating a second semi-static TDD pattern, the second semi-static TDD pattern includes a set of downlink symbols, a set of uplink symbols and a set of flexible symbols dedicated for communications between a second UE and the second TRP. In some examples, the message manager 1335 is capable of, configured to, or operable to support a means for communicating one or more messages with the second UE in accordance with the second semi-static TDD pattern.

Figure 14:
FIG. 14 shows a diagram of a system including a device that supports techniques for dynamic TDD with independent TRPs in accordance with one or more aspects of the present disclosure.

FIG. 14 shows a diagram of a system 1400 including a device 1405 that supports techniques for dynamic TDD with independent TRPs in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-Directional communications via wired links, wireless links, or both as described herein. In some examples, the transceiver 1410 may include a wired transceiver and may communicate bi-Directionally with another wired transceiver. Additionally, or alternatively, in some examples, the transceiver 1410 may include a wireless transceiver and may communicate bi-Directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting techniques for dynamic TDD with independent TRPs). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system.

A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a first TRP in accordance with examples as disclosed herein. For example, the communications manager 1420 is capable of, configured to, or operable to support a means for transmitting, to a first UE, first control signaling indicating operation in a multiple TRP mode. The communications manager 1420 is capable of, configured to, or operable to support a means for transmitting, to the first UE, second control signaling indicating a semi-static TDD pattern, where the semi-static TDD pattern includes a set of downlink symbols, a set of uplink symbols and a set of flexible symbols, where one or more flexible symbols of the set of flexible symbols are dedicated for communications between the first TRP and the first UE. The communications manager 1420 is capable of, configured to, or operable to support a means for communicating one or more messages with the first UE in accordance with the first control signaling and the semi-static TDD pattern.

By including or configuring the communications manager 1420 in accordance with examples as described herein, the device 1405 may support techniques for more efficient utilization of communication resources and improved coordination between devices. With the semi-static TDD pattern including a set of downlink symbols, a set of uplink symbols and a set of flexible symbols, where one or more flexible symbols of the set of flexible symbols are dedicated for communications between the first TRP and the first UE, the first TRP and the second TRP may simultaneously communicate with the first UE without fast backhaul communication.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of techniques for dynamic TDD with independent TRPs as described herein, or the processor 1435 and the memory 1425 may be otherwise configured to perform or support such operations.

FIG. 15 shows a flowchart illustrating a method 1500 that supports techniques for dynamic TDD with independent TRPs in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving first control signaling indicating operation in a mTRP mode. The operations of block 1505 may be performed in accordance with examples as disclosed herein. In some examples, aspects of the operations of 1505 may be performed by a multiple TRP mode manager 925 as described with reference to FIG. 9.

At 1510, the method may include receiving, from a first TRP, second control signaling indicating a semi-static TDD pattern, where the semi-static TDD pattern includes a set of downlink symbols, a set of uplink symbols and a set of flexible symbols, and where one or more flexible symbols of the set of flexible symbols are dedicated for communications with the first TRP. The operations of block 1510 may be performed in accordance with examples as disclosed herein. In some examples, aspects of the operations of 1510 may be performed by a TDD pattern manager 930 as described with reference to FIG. 9.

At 1515, the method may include communicating one or more messages with the first TRP and a second TRP in accordance with the first control signaling and the semi-static TDD pattern. The operations of block 1515 may be performed in accordance with examples as disclosed herein. In some examples, aspects of the operations of 1515 may be performed by a message manager 935 as described with reference to FIG. 9.

FIG. 16 shows a flowchart illustrating a method 1600 that supports techniques for dynamic TDD with independent TRPs in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving first control signaling indicating operation in a mTRP mode. The operations of block 1605 may be performed in accordance with examples as disclosed herein. In some examples, aspects of the operations of 1605 may be performed by a multiple TRP mode manager 925 as described with reference to FIG. 9.

At 1610, the method may include receiving, from a first TRP, second control signaling indicating a semi-static TDD pattern, where the semi-static TDD pattern includes a set of downlink symbols, a set of uplink symbols and a set of flexible symbols, and where one or more flexible symbols of the set of flexible symbols are dedicated for communications with the first TRP. The operations of block 1610 may be performed in accordance with examples as disclosed herein. In some examples, aspects of the operations of 1610 may be performed by a TDD pattern manager 930 as described with reference to FIG. 9.

At 1615, the method may include communicating one or more messages with the first TRP and a second TRP in accordance with the first control signaling and the semi-static TDD pattern. The operations of block 1615 may be performed in accordance with examples as disclosed herein. In some examples, aspects of the operations of 1615 may be performed by a message manager 935 as described with reference to FIG. 9.

At 1620, the method may include receiving, from the first TRP, first scheduling information in accordance with the semi-static TDD pattern, where the set of flexible symbols are scheduled for communications with the first TRP. The operations of block 1620 may be performed in accordance with examples as disclosed herein. In some examples, aspects of the operations of 1620 may be performed by a scheduling information manager 940 as described with reference to FIG. 9.

At 1625, the method may include communicating a first message of the one or more messages with the first TRP in accordance with the first scheduling information. The operations of block 1625 may be performed in accordance with examples as disclosed herein. In some examples, aspects of the operations of 1625 may be performed by a message manager 935 as described with reference to FIG. 9.

FIG. 17 shows a flowchart illustrating a method 1700 that supports techniques for dynamic TDD with independent TRPs in accordance with aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a first UE, first control signaling indicating operation in a multiple TRP mode. The operations of block 1705 may be performed in accordance with examples as disclosed herein. In some examples, aspects of the operations of 1705 may be performed by a multiple TRP mode manager 1325 as described with reference to FIG. 13.

At 1710, the method may include transmitting, to the first UE, second control signaling indicating a semi-static TDD pattern, where the semi-static TDD pattern includes a set of downlink symbols, a set of uplink symbols and a set of flexible symbols, where one or more flexible symbols of the set of flexible symbols are dedicated for communications between the first TRP and the first UE. The operations of block 1710 may be performed in accordance with examples as disclosed herein. In some examples, aspects of the operations of 1710 may be performed by a TDD pattern manager 1330 as described with reference to FIG. 13.

At 1715, the method may include communicating one or more messages with the first UE in accordance with the first control signaling and the semi-static TDD pattern. The operations of block 1715 may be performed in accordance with examples as disclosed herein. In some examples, aspects of the operations of 1715 may be performed by a message manager 1335 as described with reference to FIG. 13. The following provides an overview of aspects of the present disclosure:

Aspect 1: A method for wireless communications at a UE, comprising: receiving first control signaling indicating operation in a multiple transmission and reception point (TRP) mode; receiving, from a first TRP, second control signaling indicating a semi-static TDD pattern, wherein the semi-static TDD pattern comprises a set of downlink symbols, a set of uplink symbols and a set of flexible symbols, and wherein one or more flexible symbols of the set of flexible symbols are dedicated for communications with the first TRP; and communicating one or more messages with the first TRP and a second TRP in accordance with the first control signaling and the semi-static TDD pattern.

Aspect 2: The method of aspect 1, wherein communicating with the first TRP further comprising: receiving, from the first TRP, first scheduling information in accordance with the semi-static TDD pattern, wherein the set of flexible symbols are scheduled for communications with the first TRP; and communicating a first message of the one or more messages with the first TRP in accordance with the first scheduling information.

Aspect 3: The method of aspect 2, further comprising: receiving, from the second TRP, second scheduling information in accordance with the semi-static TDD pattern, wherein one or more uplink symbols of the set of uplink symbols are scheduled for communications with the second TRP, or one or more downlink symbols of the set of downlink symbols are scheduled for communications with the second TRP, or a combination thereof, and communicating a second message of the one or more messages with the second TRP in accordance with the second scheduling information and the semi-static TDD pattern.

Aspect 4: The method of any of aspects 1 through 3, wherein one or more second flexible symbols of the set of flexible symbols are dedicated for communications with the second TRP.

Aspect 5: The method of aspect 4, further comprising: receiving, from the second TRP, second scheduling information in accordance with the semi-static TDD pattern, wherein one or more uplink symbols of the set of uplink symbols are scheduled for communications with the second TRP, one or more downlink symbols of the set of downlink symbols are scheduled for communications with the second TRP, one or more flexible symbols of the one or more second flexible symbols are scheduled for communications with the second TRP, or a combination thereof, and communicating a first message of the one or more messages with the second TRP in accordance with the second scheduling information and the semi-static TDD pattern.

Aspect 6: The method of any of aspects 4 through 5, wherein the semi-static TDD pattern comprises a guard symbol between the one or more flexible symbols of the set of flexible symbols dedicated for communications with the first TRP and the one or more second flexible symbols of the set of flexible symbols dedicated for communications with the second TRP.

Aspect 7: The method of any of aspects 1 through 6, wherein one or more flexible symbols of the set of flexible symbols of the semi-static TDD pattern are dedicated for uplink communications or one or more flexible symbols of the set of flexible symbols of the semi-static TDD pattern are dedicated for downlink communications.

Aspect 8: A method for wireless communications at a first transmission and reception point (TRP), comprising: transmitting, to a first UE, first control signaling indicating operation in a multiple TRP mode; transmitting, to the first UE, second control signaling indicating a semi-static TDD pattern, wherein the semi-static TDD pattern comprising a set of downlink symbols, a set of uplink symbols and a set of flexible symbols, wherein one or more flexible symbols of the set of flexible symbols are dedicated for communications between the first TRP and the first UE; and communicating one or more messages with the first UE in accordance with the first control signaling and the semi-static TDD pattern.

Aspect 9: The method of aspect 8, wherein communicating with the first UE further comprising: transmitting, to the first UE, first scheduling information in accordance with the semi-static TDD pattern, wherein the set of flexible symbols are scheduled for communications between the first TRP and the first UE; and communicating a first message of the one or more messages with the first UE in accordance with the first scheduling information.

Aspect 10: The method of aspect 9, wherein one or more uplink symbols of the set of uplink symbols are available for communications between the first UE and the second TRP, or one or more downlink symbols of the set of downlink symbols are available for communications between the first UE and the second TRP.

Aspect 11: The method of any of aspects 8 through 10, wherein one or more second flexible symbols of the set of flexible symbols are dedicated for communications between the first UE and the second TRP.

Aspect 12: The method of aspect 11, wherein one or more uplink symbols of the set of uplink symbols are available for communications between the first UE and the second TRP, one or more downlink symbols of the set of downlink symbols are available for communications between the first UE and the second TRP, one or more flexible symbols of the one or more second flexible symbols are available for communications between the first UE and a second TRP.

Aspect 13: The method of any of aspects 11 through 12, wherein the semi-static TDD pattern comprises a guard symbol between the one or more flexible symbols of the set of flexible symbols dedicated for communications between the first TRP and the first UE and the one or more second flexible symbols of the set of flexible symbols dedicated for communications between the second TRP and the first UE.

Aspect 14: The method of any of aspects 8 through 13, wherein one or more flexible symbols of the set of flexible symbols of the semi-static TDD pattern are dedicated for uplink communications or one or more flexible symbols of the set of flexible symbols of the semi-static TDD pattern are dedicated for downlink communications.

Aspect 15: The method of any of aspects 8 through 14, further comprising: communicating, with the second TRP, third control signaling indicating the semi-static TDD pattern.

Aspect 16: The method of any of aspects 8 through 15, further comprising: communicating, with the second TRP, third control signaling indicating a second semi-static TDD pattern, the second semi-static TDD pattern comprises a set of downlink symbols, a set of uplink symbols and a set of flexible symbols dedicated for communications between a second UE and the second TRP; and communicating one or more messages with the second UE in accordance with the second semi-static TDD pattern.

Aspect 17: An apparatus for wireless communications at a UE, comprising at least one processor; at least one memory coupled with the at least one processor; and instructions stored in the at least one memory and executable by the at least one processor to cause the apparatus to perform a method of any of aspects 1 through 7.

Aspect 18: An apparatus for wireless communications at a UE, comprising at least one means for performing a method of any of aspects 1 through 7.

Aspect 19: A non-transitory computer-readable medium storing code for wireless communications at a UE, the code comprising instructions executable by a processor to perform a method of any of aspects 1 through 7.

Aspect 20: An apparatus for wireless communications at a first transmission and reception point (TRP), comprising at least one processor; at least one memory coupled with the at least one processor; and instructions stored in the at least one memory and executable by the at least one processor to cause the apparatus to perform a method of any of aspects 8 through 16.

Aspect 21: An apparatus for wireless communications at a first transmission and reception point (TRP), comprising at least one means for performing a method of any of aspects 8 through 16.

Aspect 22: A non-transitory computer-readable medium storing code for wireless communications at a first transmission and reception point (TRP), the code comprising instructions executable by a processor to perform a method of any of aspects 8 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

one or more memories storing processor-executable code; and one or more processors coupled with the one or more memories and individually or collectively operable to execute the code to cause the UE to:

receive, from a first transmission and reception point (TRP), first control signaling indicating operation in a multiple TRP mode;

receive, from the first TRP, second control signaling indicating a semi-static time division duplexing (TDD) pattern, wherein the semi-static TDD pattern comprises a set of downlink symbols, a set of uplink symbols and a set of flexible symbols, and wherein one or more flexible symbols of the set of flexible symbols are dedicated for communications with the first TRP; and communicate one or more messages with the first TRP and a second TRP in accordance with the first control signaling and the semi-static TDD pattern.

2. The UE of claim 1, wherein the one or more processors are individually or collectively further operable to execute the code to cause the UE to:

receive, from the first TRP, first scheduling information in accordance with the semi-static TDD pattern, wherein the set of flexible symbols are scheduled for communications with the first TRP; and communicate a first message of the one or more messages with the first TRP in accordance with the first scheduling information.

3. The UE of claim 2, wherein the one or more processors are individually or collectively further operable to execute the code to cause the UE to:

receive, from the second TRP, second scheduling information in accordance with the semi-static TDD pattern, wherein one or more uplink symbols of the set of uplink symbols are scheduled for communications with the second TRP, or one or more downlink symbols of the set of downlink symbols are scheduled for communications with the second TRP, or a combination thereof; and communicate a second message of the one or more messages with the second TRP in accordance with the second scheduling information and the semi-static TDD pattern.

4. The UE of claim 1, wherein one or more second flexible symbols of the set of flexible symbols are dedicated for communications with the second TRP.

5. The UE of claim 4, wherein the one or more processors are individually or collectively further operable to execute the code to cause the UE to:

receive, from the second TRP, second scheduling information in accordance with the semi-static TDD pattern, wherein one or more uplink symbols of the set of uplink symbols are scheduled for communications with the second TRP, one or more downlink symbols of the set of downlink symbols are scheduled for communications with the second TRP, one or more flexible symbols of the one or more second flexible symbols are scheduled for communications with the second TRP, or a combination thereof; and communicate a first message of the one or more messages with the second TRP in accordance with the second scheduling information and the semi-static TDD pattern.

6. The UE of claim 4, wherein the semi-static TDD pattern comprises a guard symbol between the one or more flexible symbols of the set of flexible symbols dedicated for communications with the first TRP and the one or more second flexible symbols of the set of flexible symbols dedicated for communications with the second TRP.

7. The UE of claim 1, wherein one or more flexible symbols of the set of flexible symbols of the semi-static TDD pattern are dedicated for uplink communications or one or more flexible symbols of the set of flexible symbols of the semi-static TDD pattern are dedicated for downlink communications.

8. A transmission and reception point (TRP) for wireless communication, comprising:

one or more memories storing processor-executable code; and one or more processors coupled with the one or more memories and individually or collectively operable to execute the code to cause the TRP to:

transmit, to a first user equipment (UE), first control signaling indicating operation in a multiple TRP mode;

transmit, to the first UE, second control signaling indicating a semi-static time division duplexing (TDD) pattern, wherein the semi-static TDD pattern comprises a set of downlink symbols, a set of uplink symbols and a set of flexible symbols, wherein one or more flexible symbols of the set of flexible symbols are dedicated for communications between the TRP and the first UE; and communicate one or more messages with the first UE in accordance with the first control signaling and the semi-static TDD pattern.

9. The TRP of claim 8, wherein one or more processors are individually or collectively further operable to execute the code to cause the TRP to:

transmit, to the first UE, first scheduling information in accordance with the semi-static TDD pattern, wherein the set of flexible symbols are scheduled for communications between the TRP and the first UE; and communicate a first message of the one or more messages with the first UE in accordance with the first scheduling information.

10. The TRP of claim 9, wherein one or more uplink symbols of the set of uplink symbols are available for communications between the first UE and a second TRP, or one or more downlink symbols of the set of downlink symbols are available for communications between the first UE and the second TRP, or a combination thereof.

11. The TRP of claim 8, wherein one or more second flexible symbols of the set of flexible symbols are dedicated for communications between the first UE and a second TRP.

12. The TRP of claim 11, wherein one or more uplink symbols of the set of uplink symbols are available for communications between the first UE and the second TRP, one or more downlink symbols of the set of downlink symbols are available for communications between the first UE and the second TRP, one or more flexible symbols of the one or more second flexible symbols are available for communications between the first UE and the second TRP, or a combination thereof.

13. The TRP of claim 11, wherein the semi-static TDD pattern comprises a guard symbol between the one or more flexible symbols of the set of flexible symbols dedicated for communications between the TRP and the first UE and the one or more second flexible symbols of the set of flexible symbols dedicated for communications between the second TRP and the first UE.

14. The TRP of claim 8, wherein one or more flexible symbols of the set of flexible symbols of the semi-static TDD pattern are dedicated for uplink communications or one or more flexible symbols of the set of flexible symbols of the semi-static TDD pattern are dedicated for downlink communications.

15. The TRP of claim 8, wherein the one or more processors are individually or collectively further operable to execute the code to cause the TRP to:

communicating, with a second TRP, third control signal indicating the semi-static TDD pattern.

16. The TRP of claim 8, wherein one or more processors are individually or collectively further operable to execute the code to cause the TRP to:

communicating, with a second TRP, third control signal indicating a second semi-static TDD pattern, the second semi-static TDD pattern comprising a set of downlink symbols, a set of uplink symbols and a set of flexible symbols dedicated for communications between a second UE and the second TRP; and communicate one or more messages with the second UE in accordance with the second semi-static TDD pattern.

17. A method for wireless communication by a user equipment (UE), comprising:

receiving first control signaling indicating operation in a multiple transmission and reception point (TRP) mode;

receiving, from a first TRP, second control signaling indicating a semi-static time division duplexing (TDD) pattern, wherein the semi-static TDD pattern comprises a set of downlink symbols, a set of uplink symbols and a set of flexible symbols, and wherein one or more flexible symbols of the set of flexible symbols are dedicated for communications with the first TRP; and communicating one or more messages with the first TRP and a second TRP in accordance with the first control signaling and the semi-static TDD pattern.

18. The method of claim 17, wherein communicating with the first TRP further comprising:

receiving, from the first TRP, first scheduling information in accordance with the semi-static TDD pattern, wherein the set of flexible symbols are scheduled for communications with the first TRP; and communicating a first message of the one or more messages with the first TRP in accordance with the first scheduling information.

19. The method of claim 18, further comprising:

receiving, from the second TRP, second scheduling information in accordance with the semi-static TDD pattern, wherein one or more uplink symbols of the set of uplink symbols are scheduled for communications with the second TRP, or one or more downlink symbols of the set of downlink symbols are scheduled for communications with the second TRP, or a combination thereof; and communicating a second message of the one or more messages with the second TRP in accordance with the second scheduling information and the semi-static TDD pattern.

20. The method of claim 17, wherein one or more second flexible symbols of the set of flexible symbols are dedicated for communications with the second TRP.

21. The method of claim 20, further comprising:

receiving, from the second TRP, second scheduling information in accordance with the semi-static TDD pattern, wherein one or more uplink symbols of the set of uplink symbols are scheduled for communications with the second TRP, one or more downlink symbols of the set of downlink symbols are scheduled for communications with the second TRP, one or more flexible symbols of the one or more second flexible symbols are scheduled for communications with the second TRP; and communicating a first message of the one or more messages with the second TRP in accordance with the second scheduling information and the semi-static TDD pattern.

22. The method of claim 20, wherein the semi-static TDD pattern comprises a guard symbol between the one or more flexible symbols of the set of flexible symbols dedicated for communications with the first TRP and the one or more second flexible symbols of the set of flexible symbols dedicated for communications with the second TRP.

23. The method of claim 17, wherein one or more flexible symbols of the set of flexible symbols of the semi-static TDD pattern are dedicated for uplink communications or one or more flexible symbols of the set of flexible symbols of the semi-static TDD pattern are dedicated for downlink communications.

24. A method for wireless communication by a first transmission and reception point (TRP), comprising:

transmitting, to a first user equipment (UE), first control signaling indicating operation in a multiple TRP mode;

transmitting, to the first UE, second control signaling indicating a semi-static time division duplexing (TDD) pattern, wherein the semi-static TDD pattern comprises a set of downlink symbols, a set of uplink symbols and a set of flexible symbols, wherein one or more flexible symbols of the set of flexible symbols are dedicated for communications between the first TRP and the first UE; and communicating one or more messages with the first UE in accordance with the first control signaling and the semi-static TDD pattern.

25. The method of claim 24, wherein communicating with the first UE further comprising:

transmitting, to the first UE, first scheduling information in accordance with the semi-static TDD pattern, wherein the set of flexible symbols are scheduled for communications between the first TRP and the first UE; and communicating a first message of the one or more messages with the first UE in accordance with the first scheduling information.

26. The method of claim 25, wherein one or more uplink symbols of the set of uplink symbols are available for communications between the first UE and a second TRP, or one or more downlink symbols of the set of downlink symbols are available for communications between the first UE and the second TRP.

27. The method of claim 24, wherein one or more second flexible symbols of the set of flexible symbols are dedicated for communications between the first UE and a second TRP.

28. The method of claim 27, wherein one or more uplink symbols of the set of uplink symbols are available for communications between the first UE and the second TRP, one or more downlink symbols of the set of downlink symbols are available for communications between the first UE and the second TRP, one or more flexible symbols of the one or more second flexible symbols are available for communications between the first UE and a second TRP.

29. The method of claim 27, wherein the semi-static TDD pattern comprising a guard symbol between the one or more flexible symbols of the set of flexible symbols dedicated for communications between the first TRP and the first UE and the one or more second flexible symbols of the set of flexible symbols dedicated for communications between the second TRP and the first UE.

30. The method of claim 24, wherein one or more flexible symbols of the set of flexible symbols of the semi-static TDD pattern are dedicated for uplink communications or one or more flexible symbols of the set of flexible symbols of the semi-static TDD pattern are dedicated for downlink communications.

* * * * *